(12) United States Patent
Chen et al.

(10) Patent No.: US 10,508,683 B2
(45) Date of Patent: Dec. 17, 2019

(54) GIMBAL FOR IMAGE CAPTURING

(71) Applicant: SZ DJI OSMO TECHNOLOGY CO., LTD., Shenzhen (CN)

(72) Inventors: Zihan Chen, Shenzhen (CN); Shanguang Guo, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 142 days.

(21) Appl. No.: 15/471,744

(22) Filed: Mar. 28, 2017

(65) Prior Publication Data
US 2017/0198747 A1 Jul. 13, 2017

Related U.S. Application Data

(63) Continuation of application No. PCT/CN2015/083232, filed on Jul. 2, 2015.

(51) Int. Cl.
*F16C 11/06* (2006.01)
*F16M 11/10* (2006.01)
(Continued)

(52) U.S. Cl.
CPC ............ *F16C 11/06* (2013.01); *B64C 39/024* (2013.01); *B64D 47/08* (2013.01); *F16M 11/041* (2013.01); *F16M 11/105* (2013.01); *F16M 11/18* (2013.01); *F16M 11/2064* (2013.01); *G03B 15/006* (2013.01); *G03B 17/561* (2013.01); *G05D 1/0094* (2013.01); *H04N 5/2328* (2013.01); *B64C 2201/123* (2013.01); *B64C 2201/127* (2013.01); *F16M 2200/041* (2013.01);
(Continued)

(58) Field of Classification Search
CPC ................................ B64C 11/04; B64C 11/02

USPC .................................................. 348/142–148
See application file for complete search history.

(56) References Cited

U.S. PATENT DOCUMENTS 5,897,223 A 4/1999 Tritchew et al.
5,900,925 A 5/1999 Navarro
(Continued)

FOREIGN PATENT DOCUMENTS

CN 1471307 A 1/2004
CN 101014090 A 8/2007
(Continued)

OTHER PUBLICATIONS

International search report and written opinion dated Mar. 18, 2016 for PCT Application No. PCT/CN2015/083232.

*Primary Examiner* — Anand S Rao
(74) *Attorney, Agent, or Firm* — Anova Law Group, PLLC

(57) ABSTRACT

The present disclosure described devices and methods for stabilizing a payload. A carrier may be provided. The carrier may manipulate a payload such that the payload is able to rotate about a roll axis by 90 degrees or more. In some instances, the carrier may be directly connected to a component (e.g., gimbal component) configured to permit rotation of the payload about a roll axis. The carrier described herein can have a compact configuration that allows for minimal volume and weight and may be ideally suited for mobile use. Particularly, the carrier may be mounted on an unmanned aerial vehicle (UAV). In some instances, an imaging device may be coupled to the carrier and images having horizontal orientation, vertical orientations, or orientations in-between may be captured and processed.

20 Claims, 11 Drawing Sheets

(51) Int. Cl.

| | | |
|---|---|---|
| *F16M 11/18* | (2006.01) | |
| *F16M 11/20* | (2006.01) | |
| *B64D 47/08* | (2006.01) | |
| *G03B 17/56* | (2006.01) | |
| *B64C 39/02* | (2006.01) | |
| *F16M 11/04* | (2006.01) | |
| *G03B 15/00* | (2006.01) | |
| *G05D 1/00* | (2006.01) | |
| *H04N 5/232* | (2006.01) | |

(52) U.S. Cl.
CPC . *F16M 2200/044* (2013.01); *F16M 2200/045* (2013.01)

(56) References Cited

U.S. PATENT DOCUMENTS

| | | | |
|---|---|---|---|
| 5,978,137 A | 11/1999 | Takahashi et al. | |
| 6,708,943 B2 | 3/2004 | Ursan et al. | |
| 7,534,057 B2 | 5/2009 | Jones et al. | |
| 9,030,149 B1 | 5/2015 | Chen et al. | |
| 9,630,703 B2 * | 4/2017 | Wang | B64C 39/024 |
| 2007/0241244 A1 | 10/2007 | Tavassoli | |
| 2015/0097950 A1 | 4/2015 | Wang et al. | |

FOREIGN PATENT DOCUMENTS

| | | |
|---|---|---|
| CN | 101026015 A | 8/2007 |
| CN | 201298136 Y | 8/2009 |
| CN | 101598886 A | 12/2009 |
| CN | 101975665 A | 2/2011 |
| CN | 202372743 U | 8/2012 |
| CN | 203306224 U | 11/2013 |
| CN | 103426282 A | 12/2013 |
| CN | 203686509 U | 7/2014 |
| CN | 104169628 A | 11/2014 |
| CN | 204250379 U | 4/2015 |
| GB | 2481047 A | 12/2011 |
| JP | 2001235793 A | 8/2001 |
| JP | 2010039350 A | 2/2010 |
| WO | 2006065892 A2 | 6/2006 |

* cited by examiner

GIMBAL FOR IMAGE CAPTURING

CROSS-REFERENCE

This application is a continuation application of International Patent Application PCT/CN2015/083232, filed Jul. 2, 2015, which is incorporated herein by reference in its entirety and to which application we claim priority under 35 USC § 120.

BACKGROUND

Gimbals of wide ranging configurations, sizes, and capabilities have been developed for a variety of applications. For example, a gimbal may be used in applications relating to inertial navigation, rocket engines, photography, and imaging. In some instances, a gimbal may be used to provide stability to a payload which it supports. For example, a gimbal may support a payload such as an imaging device. For images captured by the imaging device while in motion, a gimbal may counteract effects produced by unwanted movement and aid in capture of clear images (e.g., smooth sequence of images) without motion blur.

However, existing gimbal configurations may be less than ideal. In some instances, the gimbal configuration may necessitate large volumes and weight which is not optimal for mobile use. In some instances, the gimbal mechanism may limit rotation of the payload with respect to certain axes. In some instances, the gimbal mechanism may limit or hinder acquisition of vertical oriented images.

SUMMARY

A need exists for an improved gimbal for supporting a payload. The gimbal may manipulate a payload such that the payload is able to rotate about a roll axis by 90 degrees or more. In some instances, the payload may be directly connected to a component (e.g., gimbal component) configured to permit rotation of the payload about a roll axis. The gimbal described herein can have a compact configuration that allows for minimal volume and weight and may be ideally suited for mobile use. Particularly, the gimbal may be mounted on an unmanned aerial vehicle (UAV). In some instances, an imaging device may be coupled to the gimbal and images having horizontal orientation, vertical orientations, or orientations in-between may be captured and processed.

Thus, in one aspect, a carrier for stabilizing a payload is provided. The carrier comprises: a first carrier component configured to permit rotation of the payload about a pitch axis; a second frame component that is (1) supported by the first carrier component and (2) configured to permit rotation of the payload about a yaw axis; and a third carrier component that is (1) supported by the second carrier component, (2) configured to permit rotation of the payload about a roll axis and (3) connects to the payload.

In another aspect, a method of stabilizing a payload fitted in a carrier is provided. The method comprises: providing a first carrier component of the carrier configured to permit rotation of the payload about a pitch axis; supporting a second carrier component of the carrier using the first carrier component, wherein the second carrier component is configured to permit rotation of the payload about a yaw axis; and supporting a third carrier component using the second carrier component, wherein the third carrier component is (1) configured to permit rotation of the payload about a roll axis and (2) connects to the payload.

In another aspect, a carrier for stabilizing a payload is provided. The carrier comprises: a first carrier component configured to permit rotation of the payload about a first rotational axis; a second carrier component that is (1) supported by the first carrier component, and (2) configured to permit rotation of the payload about a second rotational axis different from the first rotational axis; and a third carrier component that is (1) supported by the second carrier component, and (2) configured to permit more than or equal to a 90 degree rotation of the payload about a roll axis when the payload is supported by the third carrier component.

In another aspect, a method of stabilizing a payload fitted in a carrier is provided. The method comprises: providing a first carrier component of the carrier configured to permit rotation of the payload about a first rotational axis; supporting a second carrier component of the carrier using the first carrier component, wherein the second carrier component is configured to permit rotation of the payload about a second rotational axis different from the first rotational axis; and supporting a third carrier component using the second carrier component, wherein the third carrier component is configured to permit more than or equal to a 90 degree rotation of the payload about a roll axis.

In another aspect, a carrier for stabilizing a camera supported by the carrier is provided. The carrier comprises: a first carrier component; a second carrier component supported by the first carrier component; and a third carrier component that is (1) supported by the second carrier component and (2) configured to permit rotation of the camera about a roll axis; a controller that receives a desired orientation of an image to be captured by the camera, wherein the desired orientation is a horizontal orientation or a vertical orientation of the image; and one or more sensors in communication with a motor configured to control rotation of the camera about the roll axis, wherein the one or more sensors are (1) configured to sense a degree of rotation of the motor, and (2) transmit the degree of rotation of the motor to the controller, wherein the controller instructs the motor to rotate the camera to achieve the desired orientation of the image based on the sensed degree of rotation of the motor.

In another aspect, a method of stabilizing a camera fitted in a carrier is provided. The method comprises: providing a first carrier component of the carrier; supporting a second carrier component of the carrier using the first carrier component; supporting a third carrier component using the second carrier component, wherein the third carrier component is configured to permit rotation of the camera about a roll axis; receiving, at a controller, a desired orientation of an image to be captured by the camera, wherein the desired orientation is a horizontal orientation or a vertical orientation of the image; sensing a degree of rotation of a motor configured to control rotation of the camera about the roll axis; and transmitting the degree of rotation of the motor to the controller, wherein the controller instructs the motor to rotate the camera to achieve the desired orientation of the image based on the sensed degree of rotation of the motor.

In another aspect, a carrier for stabilizing a payload is provided. The carrier comprises: a first carrier component that is configured to permit rotation of the payload about a roll axis of greater than 90° when the payload is supported by the first carrier component; and at least one additional carrier component (1) operably connected to the first carrier component and (2) configured to collectively permit rotation of the payload about a yaw axis or a pitch axis, wherein the carrier has a volume that is no more than about 3 times a volume of the payload.

In another aspect, a method of stabilizing a payload fitted in a carrier is provided. The method comprises: providing a first carrier component that is configured to permit rotation of the payload about a roll axis of greater than 90° when the payload is supported by the first carrier component; and providing at least one additional frame component (1) operably connected to the first carrier component and (2) configured to collectively permit rotation of the payload about a yaw axis or a pitch axis, wherein the carrier has a volume that is no more than about 3 times a volume of the payload.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
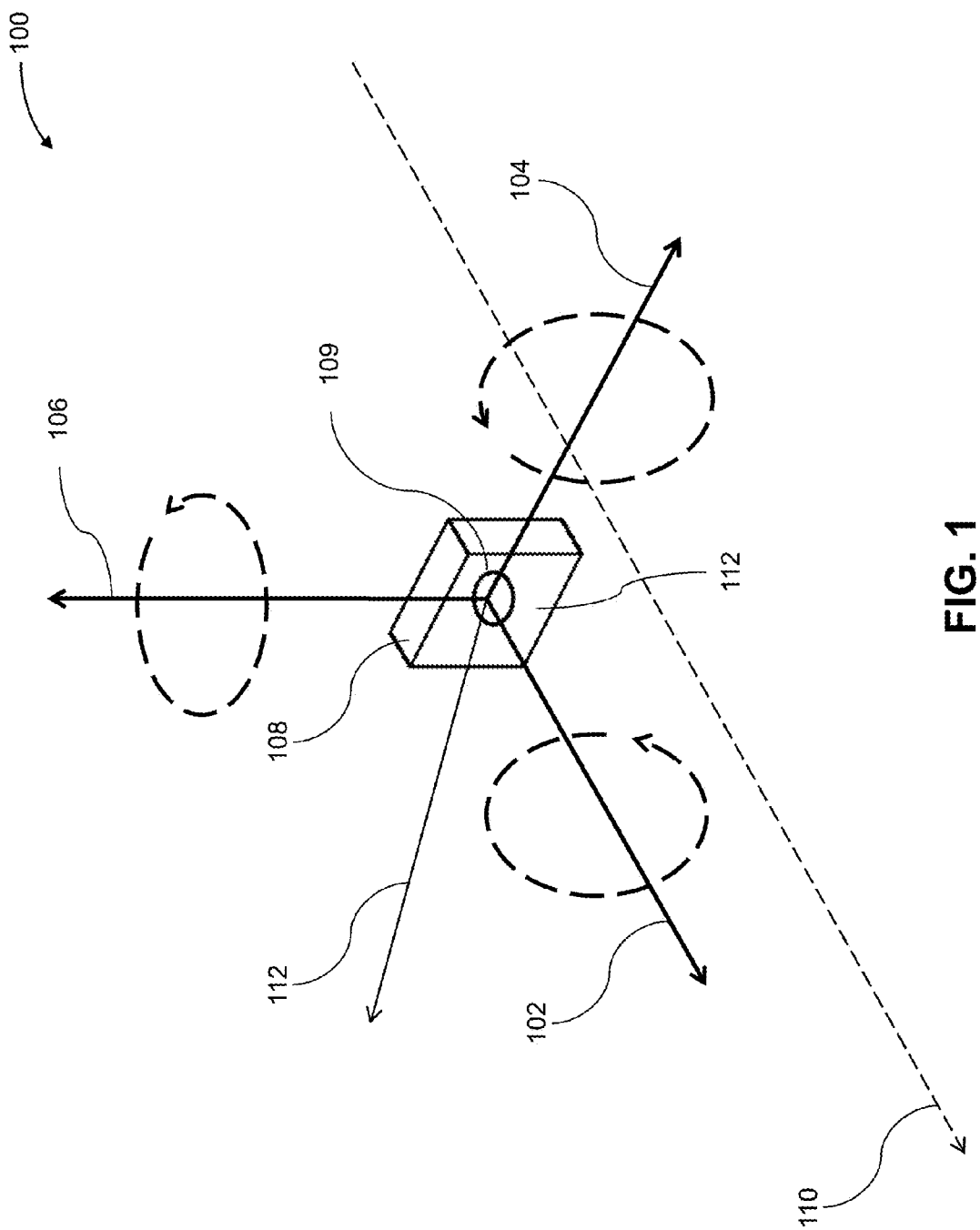
FIG. 1 illustrates a roll axis, pitch axis, and yaw axis of a payload, in accordance with embodiments.

The devices and methods of the present invention provide a carrier for stabilizing or positioning a payload. The carrier may comprise one or more components configured to be coupled to one another and/or the payload. A carrier as used herein may refer to a gimbal, and the terms "carrier" and "gimbal" may be used interchangeably throughout. The gimbal of the present disclosure may be ideally suited for mobile use, being compact in volume and low in weight. Each of the gimbal components may be configured to permit rotation of the payload around a certain axis (e.g., roll, pitch, or yaw axis) of the payload. The payload may be directly coupled to a gimbal component configured to permit rotation of the payload about a roll axis. In some instances, the gimbal may permit rotation of the payload about the roll axis equal to or greater than 90°.

In many instances, the payload may be an imaging device such as a camera. In some instances, a controller may receive a desired orientation of an image to be captured by the imaging device. The desired orientation, for example, may be a vertical orientation (e.g., portrait image) or a horizontal orientation (e.g., landscape image), or an arbitrary orientation (e.g., between the vertical and horizontal orientation). In response, the controller may instruct one or more actuators of the gimbal to actuate such that the desired image may be captured. In many instances, the gimbal may be coupled to a movable object such as a vehicle, (e.g., an unmanned aerial vehicle or UAV). The vehicle may be self-propelled. In some instances, the gimbal may be carried by a user (e.g., photographer). For instance, the movable object may be a handheld frame or part of a wearable object. The gimbal may provide stability to the payload and/or may provide a wider range of configuration compared to other gimbals.

A payload as used herein may refer to any part of a load or an object supported by the gimbal. The payload can be configured not to perform any operation or function. Alternatively, the payload can be a payload configured to perform an operation or function, also known as a functional payload. For example, the payload can include one or more sensors for surveying one or more targets. The sensor may collect information about the environment around the sensor. Any suitable sensor can be incorporated into the payload, such as an imaging device. An imaging device as described herein may comprise a visual imaging device (e.g., image capture device, camera, etc), an infrared imaging device, an ultraviolet imaging device, a thermal imaging device, etc. Other suitable sensors that may be incorporated into the payload may include an audio capture device (e.g., a parabolic microphone), radio-frequency (rf) sensors, magnetic sensors, ultrasonic sensors, etc. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

The payload may comprise a single type of sensor, emitter, and/or tool. The payload may comprise multiple types of sensors, emitters, and/or tools. The payload may comprise any number and combination of sensors, emitters, and or tools described herein, e.g., sensor array.

A gimbal may refer to a pivoted support that allows a rotation of a payload around one or more axes of rotation. In some instances, a gimbal may comprise a plurality of gimbal components. A gimbal component may refer to a pivoted support that allows a rotation of a payload around a single axis of rotation. A gimbal may comprise one, two, three, four, five, six, seven, eight or more gimbal components. In many instances, multiple gimbal components may be coupled to one another to enable rotation of an object around multiple axes of rotations. The axes of rotations may be perpendicular to one another, or at any arbitrary angle, e.g., 10°, 15°, 30°, 45°, 60°, 75°, 90°, 120°, 150°, 180°, 210°, 240°, 270°, 300°, 330°, 360° relative to each other. In one example, the gimbal may be a 3-axis gimbal which include components that permit a rotation about pitch, roll, and yaw axes.

A gimbal may provide stability to an object that is coupled to the gimbal. For example, using a set of three gimbal components (e.g., coupled to one another with orthogonal pivot axes), a payload mounted on the innermost gimbal may remain still despite external movement due to rotation of its support members in response to the external movement. In some instances, a sensor may be provided (e.g., inertial measurement unit (IMU)) that measures a position and/or movement of a payload or a gimbal. Data from the sensors may be utilized and control signals may instruct actuators (e.g., motors) on the gimbal to actuate in response to the movement such that a payload is stabilized.

A gimbal may be configured to deliberately control a state of the payload (e.g., position and/or orientation). A gimbal may provide rotational and/or translational mobility to the payload. For example, a command may be provided to position the payload in a particular orientation or configuration (e.g., about one axis, two axes, or three axes). For example, the command may be provided to position the payload in a vertical orientation or a horizontal orientation. The orientation or configuration may be relative to a reference. The reference may be the environment, the gimbal (e.g., each of the gimbal components), or a movable object to which the gimbal is coupled to (e.g., unmanned aerial vehicle). The particular orientation of the payload may be static (e.g., unmoving) relative to the reference or may be variable (e.g., changing in a particular controlled way) relative to the reference. A controller (e.g., microcontroller) may receive the command and further provide instructions to a motor (e.g., to actuate). In response, motors on a gimbal may actuate such that the payload is put in the desired configuration and/or orientation.

A gimbal may operate in a three dimensional space. The gimbal may be configured to move (e.g., with respect to one, two, or three degrees of translation and/or one, two, or three degrees of rotation). A gimbal may be configured to move the payload (e.g., with respect to one, two, or three degrees of translation and/or one, two, or three degrees of rotation) and the payload supported by a gimbal may operate in a three dimensional space.

Rotational movement of an object (e.g., payload) supported by a gimbal may be defined by a roll, pitch, and yaw axes. FIG. 1 illustrates a roll axis, pitch axis, and yaw axis of a payload. An object having directionality (e.g., gimbal or a payload such as an imaging device) may have frontal, transverse, and perpendicular axes. For example, the payload 108 may be an upright imaging device with lens or aperture 109 receiving light from a frontal side 112. The imaging device may have frontal axis 102, transverse axis 104, and perpendicular axis 106. An axis parallel to or coinciding with the frontal axis may be referred to herein as the roll axis. An axis parallel to or coinciding with the transverse axis may be referred to herein as the pitch axis. An axis parallel to or coinciding with the perpendicular axis may be referred to herein as the yaw axis. Each of the roll, pitch, or yaw axis may or may not intersect with a center of gravity (e.g., center of mass) of the payload. For example, both axis 102 and 110 may be referred to herein as roll axes of the payload.

A gimbal may enable a rotation of a payload about the roll axis, pitch axis, or yaw axis. In some instances, the roll, pitch, and yaw axes as used herein may refer to a roll, pitch, and yaw axes of the payload at a predetermined stationary state. For example, the roll, pitch, and yaw axes may refer to a roll, pitch, and yaw axes of the payload coupled to the gimbal prior to any actuation of the gimbal (e.g., at a resting state). For a payload comprising an imaging device, one or more of the axes (e.g., roll, pitch, or yaw axes) may interact with or be related to an optical axis of the imaging device. For example, the roll axis may coincide or align (e.g., coaxially) with an optical axis of the imaging device. For example, an optical axis of a lens of the imaging device may coincide with the frontal axis. In some instances, an optical axis of a lens of the imaging device may align coaxially with the frontal axis, or a roll axis.

A gimbal may comprise one, two, three, four, five, six, seven, eight, nine, ten or more gimbal components to support the payload. A single gimbal mechanism may enable rotation of a payload about a single roll, pitch, or yaw axes. Each of the gimbal components may be all orthogonal to one another or at a certain angle relative to one another. Different gimbal components may be positioned at different relative angles to one another. For example, certain gimbal components may be orthogonal to one another while other gimbal components are not. Each gimbal component may control rotation about a same axis or different axes. The gimbal may comprise additional structural components or translational components. Structural components may provide additional structural integrity to the gimbal. Translational components may enable translational of the gimbal components and/or the payload (e.g., translational capability without rotation) relative to one another.

In some instances, a gimbal may comprise a single gimbal component to support the payload. For example, the single gimbal component may enable rotation of the payload about a roll axis 110. Alternatively, the single gimbal component may enable rotation of the payload about a yaw axis or a pitch axis. A position of the center of gravity of the payload may change in response to a rotation. Alternatively, the position of the center of gravity of the payload may remain the same. This may occur when the axis of rotation intersects the center of gravity of the payload.

In some instances, a gimbal may comprise two gimbal components to support the payload. Each of the two gimbal components may enable rotation of a payload about a roll axis, pitch axis, or yaw axis. In alternate embodiments, the gimbal components may permit rotation of the payload about any other axis, as described elsewhere herein. Each of the two gimbal components may enable rotation of a payload about axes that are perpendicular to one another. For example, one of the two gimbal components may enable rotation of a payload about the roll axis while another gimbal component may enable rotation of the payload about the yaw or pitch axes. Each of the two gimbal component may enable rotation of a payload about axes that are parallel to one another. For example, one of the two gimbal component may enable rotation of a payload about roll axis 102 while another gimbal component may enable rotation of the payload about roll axis 110. In some instances, each of the two gimbal component may enable rotation of the payload about axes that are neither parallel nor perpendicular to another. For example, one of the two gimbal component may enable rotation of a payload about roll axis 102 while another gimbal component may enable rotation of a payload about axis 112. The gimbal may be configured to support the payload at any of the gimbal components. For example, the gimbal component configured to enable rotation of a payload about the roll axis may be configured to couple with, or directly connect to the payload. For example, the gimbal component configured to enable rotation of a payload about the yaw or pitch axis may be configured to couple with, or directly connect to the payload.

In some instances, a gimbal may comprise three gimbal components to support the payload. Each of the three gimbal components may enable rotation of a payload about a roll axis, pitch axis, or yaw axis. In alternate embodiments, the gimbal components may permit rotation of the payload about any other axis, as described elsewhere herein. Each of the three gimbal components may enable rotation of a payload about axes that are perpendicular to one another. For example, a first gimbal component may enable rotation of a payload about the roll axis, a second gimbal component may enable rotation of the payload about the pitch axis, while a third gimbal component may enable rotation of the payload about the yaw axis. For example, a first gimbal component may enable rotation of a payload about the roll axis, a second gimbal component may enable rotation of the payload about the yaw axis, while a third gimbal component may enable rotation of the payload about the pitch axis. In some instances, the three gimbal components or two of the three gimbal mechanisms may each enable rotation of a payload about axes that are parallel to one another. In some instances, some or all of the three gimbal mechanisms may enable rotation of the payload about axes that are neither parallel nor perpendicular to one another. In some instances, the gimbal may comprise one, two, three, four, five, six or more gimbal mechanisms to support the payload. In some instances, the number of gimbal components may correspond to a number of perpendicular axes about which a payload may rotate. The gimbal may be configured to support the payload at any of the gimbal components. For example, the gimbal component configured to enable rotation of a payload about the roll axis may be configured to couple with, or directly connect to the payload. For example, the gimbal component configured to enable rotation of a payload about the yaw or pitch axis may be configured to couple with, or directly connect to the payload.

Similar types of variations may apply to gimbals having more gimbal components. For instance, for gimbals having four or more gimbal components, the gimbal components may enable rotation of the payload about the roll, yaw, and pitch axes. The gimbal in its entirety may enable rotation of the payload about the roll, yaw, and pitch axes. In some instances, two or more of the gimbal components may have parallel axes of rotation.

Figure 2:
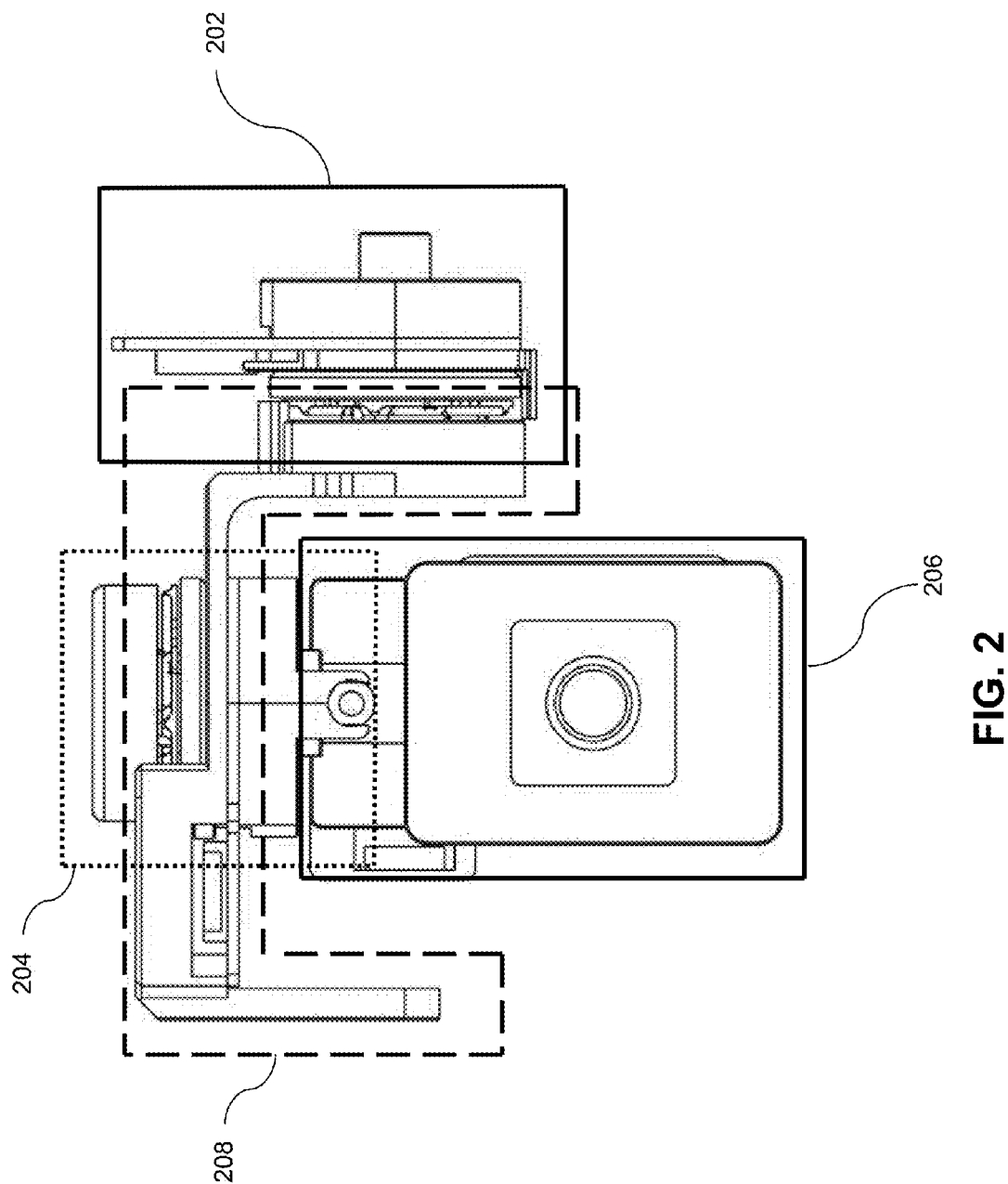
FIG. 2 illustrates a frontal view of a gimbal comprising three gimbal components, in accordance with embodiments.

FIG. 2 illustrates a frontal view of a gimbal comprising three gimbal components, in accordance with embodiments. The gimbal may comprise a first gimbal component 202, a second gimbal component 204, and a third gimbal component 206. The gimbal may optionally comprise additional frame components, such as intermediary frame component 208. Each gimbal component may optionally comprise a frame and an actuator.

Figure 3:
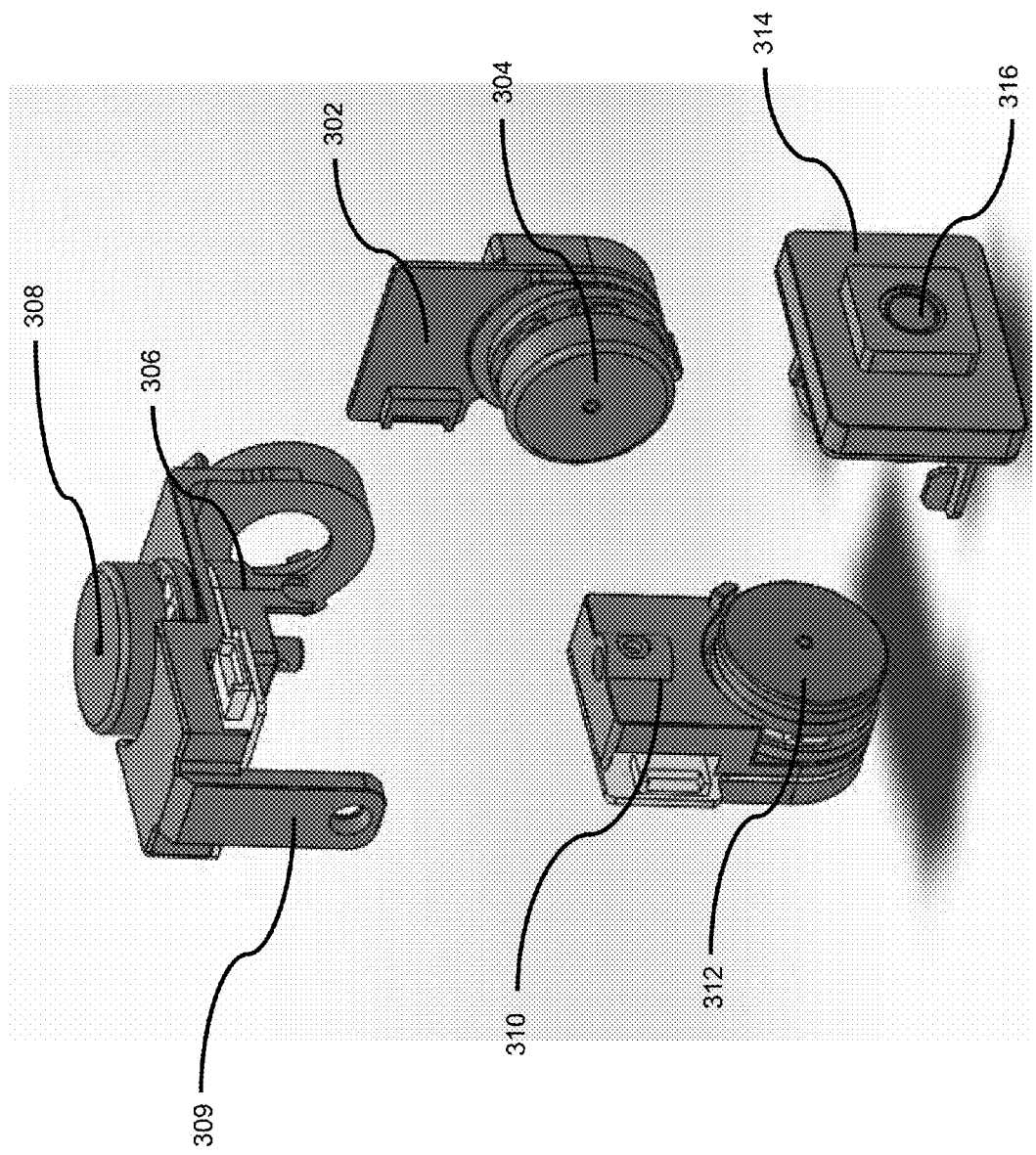
FIG. 3 illustrates an exploded view of a gimbal comprising three gimbal components, in accordance with embodiments.

FIG. 3 illustrates an exploded view of a gimbal comprising three gimbal components, in accordance with embodiments. A first gimbal component may comprise a first frame 302 and a first actuator 304. A second gimbal component may comprise a second frame 306 and a second actuator 308. In some instances, an intermediary frame component 309 may be provided. The intermediary frame component may be utilized in connecting different gimbal components, e.g., the first gimbal component and the second gimbal component. In some instances, the first gimbal component may be indirectly connected to the second gimbal component through the intermediary frame component. In some instances, the first and/or second gimbal component may comprise the intermediary frame component. A third gimbal component may comprise a third frame 310 and a third actuator 312. The third gimbal component may optionally comprise a frame component 314, herein referred to as a coupling plate. The coupling plate may be removably coupled to the third actuator (e.g., third gimbal component) or may be permanently coupled to the third actuator. The coupling plate may enable a payload (e.g., camera) to be more easily coupled to the gimbal. In some instances, the coupling plate may be omitted, and the payload may be directly connected to the third gimbal component, e.g., to the third actuator 314. In some instances, the coupling plate may comprise a payload. For example, the coupling plate may comprise a camera. The coupling plate may comprise a lens 316 and an image sensor for capturing images.

A frame as used herein may refer to any structural portion of the gimbal component configured to provide structural support (e.g., to the payload or the gimbal). The frame may comprise rigid parts. The frame may also be referred to henceforth as a frame component. The coupling plate may support a payload.

An actuator may comprise moving parts. The actuator may allow movement of the gimbal components relative to one another and/or a supporting structure. The actuator may be a rotary actuator configured to produce a rotary motion or torque. An actuator may comprise an automatic or machine-driven component such as an electric motor. In some instances, the motor may comprise a brushless motor. In some instances, the motor may comprise a servomotor. A servomotor may comprise a motor, a sensor, and a controller for precise control of the motor. A servomotor may comprise sensors (e.g., a hall sensor or a potentiometer) to detect a position, speed, and/or acceleration of the motor. A controller may receive data (e.g., information) from the sensors and further control an angular position, velocity, acceleration and/or torque of the motor as desired. Alternatively or in combination, an actuator may comprise a manually-manipulated component such as a lever, a handle, a knob, or a tilting mechanism. A frame may rotate in response to an actuation of the corresponding actuator (e.g., motor).

The actuator may maintain or vary an orientation of the gimbal components (e.g., gimbal frame). For example, the actuator may receive an electronic signal (e.g., command) from a controller to actuate. The command to actuate may be received in response to human input. Alternatively or in conjunction, the command to actuate may be generated by the controller automatically without human interference.

The actuator may actuate in response to the electronic signal. Actuation of the actuator may directly drive the frame and/or components coupled to the actuator. Actuation of the actuator may directly cause components directly coupled to the actuator to rotate about a longitudinal axis of the actuator. Actuation of the actuator may directly cause components indirectly coupled to the actuator to rotate about a longitudinal axis of the actuator. Directly connected as used herein may refer to the payload being connected to the third gimbal component without an intermediary component or structure, e.g., gimbal component, intermediary frame component, coupling plate, etc. For example, an actuator on the second gimbal component may actuate and directly drive rotation of the third frame component. A payload which is indirectly coupled to the second gimbal component may in turn rotate about the longitudinal axis of the actuator on the second gimbal component.

A direction of rotation (e.g., of the frame) may be clockwise. A direction of rotation (e.g., of the frame) may be counter-clockwise. An actuation may be affect rotation of the frame in a clockwise direction or a counter-clockwise direction. An actuator may permit control of rotation about both a clockwise and counter-clockwise direction.

The actuator's angular position (e.g., orientation), angular velocity, angular acceleration, and/or torque may be controlled. Correspondingly, the actuator may be used to control an angular position and/or orientation, angular velocity, and an angular acceleration of components directly or indirectly coupled to the actuator. In some instances, a controller may be provided to automatically or semi-automatically control parameters of the actuator. In some instances, parameters of the actuator may be manually controlled. For example, a user may input desired parameters which may be relayed to a controller configured to control the actuators. For example, the user may manually control parameters of the actuators (e.g., manually actuate the actuators).

The position of the actuator (e.g., and the corresponding frame and/or other components coupled thereto) may be controlled to within 0.05°, 0.1®, 0.5°, 1°, 2°, 5°, 10°, 20°, 30° of a desired position. The position of the actuator (e.g., and the corresponding frame and/or other components coupled thereto) may be rotated to about 0°, 5°, 10°, 20°, 30°, 45°, 60°, 75°, 90°, 120°, 150°, 180°, 210°, 240°, 270°, 300°, 330°, or 360° relative to a resting position (e.g., in a clockwise or counter-clockwise direction). The position of the actuator (e.g., and the corresponding frame and/or other components coupled thereto) may be rotated greater than about 0°, 5°, 10°, 20°, 30°, 45°, 60°, 75°, 90°, 120°, 150°, 180°, 210°, 240°, 270°, 300°, 330°, or 360° relative to a resting position (e.g., in a clockwise or counter-clockwise direction). The position of the actuator (e.g., and the corresponding frame and/or other components coupled thereto) may be rotated less than about 0°, 5°, 10°, 20°, 30°, 45°, 60°, 75°, 90°, 120°, 150°, 180°, 210°, 240°, 270°, 300°, 330°, or 360° relative to a resting position (e.g., in a clockwise or counter-clockwise direction).

Figure 4:
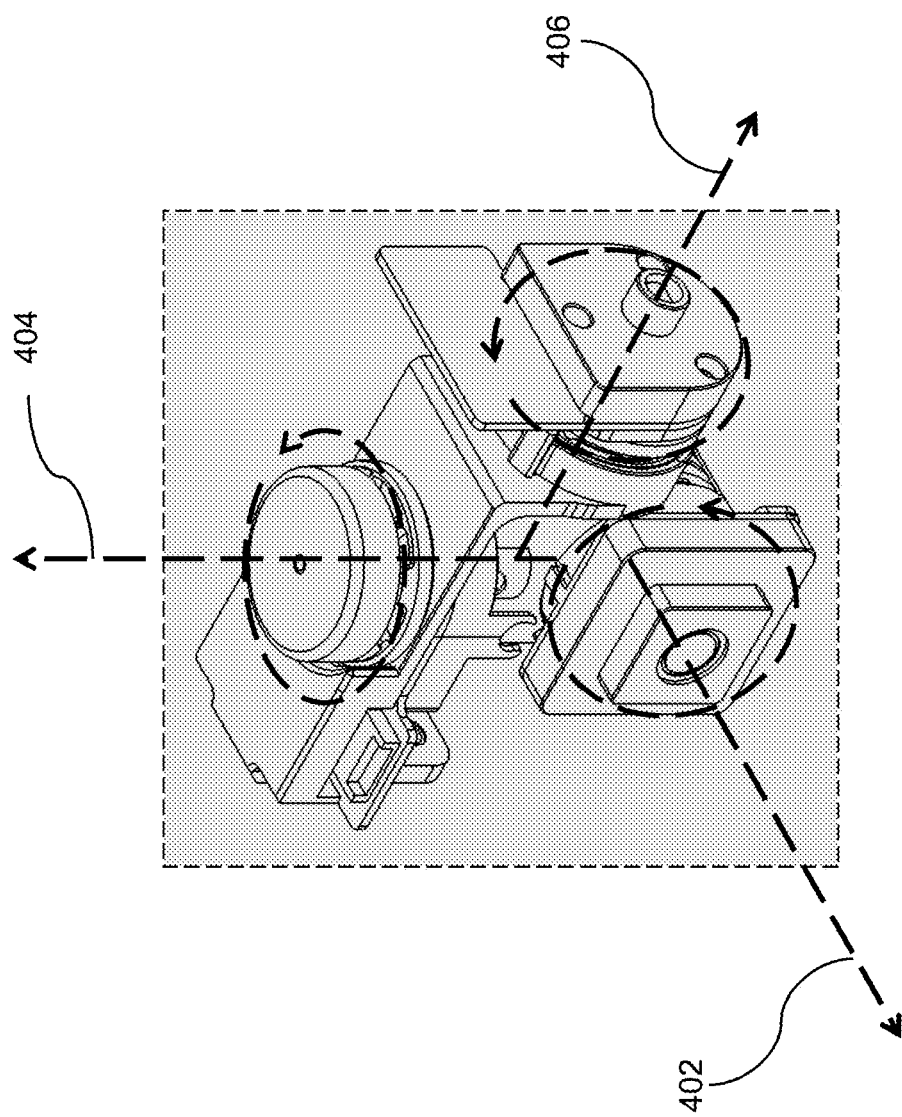
FIG. 4 illustrates a perspective view of a gimbal comprising three gimbal components, in accordance with embodiments.

FIG. 4 illustrates a perspective view of a gimbal comprising three gimbal components, in accordance with embodiments. In some instances, a payload may be coupled to the third gimbal component. For example, the payload may be configured to directly connect to, or contact, the third gimbal component as further described elsewhere. The third gimbal component may be configured to enable or permit rotation of the payload about a longitudinal axis 402 of the third actuator. The longitudinal axis of the third actuator may coincide with the roll axis. For example, the longitudinal axis of the third actuator may coincide with the roll axis of the payload, the roll axis of the gimbal, and/or the roll axis of an object on which the gimbal may be mounted (e.g., vehicle). The third gimbal component may be configured to drive, hold, or support a payload. The payload may be held in place with aid of the third gimbal component. The third gimbal component may optionally be supported by one, two, three, four, five or more additional gimbal components. The additional gimbal components may enable or permit rotation of the payload about the same, or different axes than the third gimbal component.

In some instances, the third gimbal component may be coupled to the second gimbal component. For example, the third gimbal component may be configured to directly connect (e.g., contact) to the second gimbal component. The second gimbal component may support the third gimbal component. The second gimbal component may be configured to enable or permit rotation of the payload about a longitudinal axis 404 of the second actuator. The longitudinal axis of the second actuator may coincide with the yaw axis. For example, the longitudinal axis of the second actuator may coincide with the yaw axis of the payload, the yaw axis of the gimbal, and/or the yaw axis of an object on which the gimbal may be mounted (e.g., vehicle). Alternatively, the longitudinal axis of the second actuator may coincide with the pitch axis.

In some instances, the second gimbal component may be coupled to the first gimbal component. For example, the second gimbal component may be configured to directly connect (e.g., contact) to the first gimbal component. In some instances, the second gimbal component may be configured to indirectly connect to the first gimbal component (e.g., via intermediary frame component). The first gimbal component may support the second gimbal component. The first gimbal component may be configured to enable or permit rotation 406 of the payload about a longitudinal axis of the first actuator. The longitudinal axis of the first actuator may coincide with a pitch axis. For example, the longitudinal axis of the first actuator may coincide with the pitch axis of the payload, the pitch axis of the gimbal, and/or the pitch axis of an object on which the gimbal may be mounted (e.g., vehicle). Alternatively, the longitudinal axis of the first actuator may coincide with the yaw axis.

In some instances, the first gimbal component may be configured to be supported by a support structure, e.g., of an unmanned aerial vehicle (UAV). In some instances, the first gimbal component may be optional, and the second gimbal component may be configured to be supported by a support structure. In some instances, any and/or all of the aforementioned components may be coupled to an external support structure (e.g., of a UAV, or a handle). For example, the first gimbal component and/or second gimbal component may be coupled to a support structure. For example, the intermediary frame component may be coupled to a support structure.

The gimbal components may be configured to be arranged in a series. The gimbal components may be ordered in sequential succession to the payload. For example, in reference to FIG. 2, the first gimbal component 202 may be the first in the series, the second gimbal component 204 may be the second in the series and the third gimbal component 206 may be the third in the series. The ordering of the series may depend on a degree of separation of each gimbal component from the payload.

A gimbal component further removed away from the payload may be earlier in the series. A gimbal component closer in degree to the payload may be later in the series. A proximity to the payload may depend on spatial proximity. A proximity to the payload may depend on a number of intermediaries between the gimbal component and the payload. For example, the first gimbal component may be separated from a payload by three intermediaries, e.g., 1) intermediary frame component 208, 2) second gimbal component 204, and 3) third gimbal component 206 which is coupled to the payload. For example, the third gimbal component may be separated from a payload by no intermediary. The first gimbal component separated from the payload by three intermediaries may be further removed away from the payload than the third gimbal component separated from the payload by no intermediary. Therefore, the first gimbal component may be earlier in the series.

Gimbal components earlier in the series may be referred to as being located upstream relative to gimbal components later in the series. Gimbal components later in the series may be referred to as being located downstream relative to gimbal components earlier in the series. For example, the third gimbal component 206 is located downstream of the second gimbal component 204 which is located downstream of the first gimbal component 202. For example, the first gimbal component is located upstream of the second gimbal component which is located upstream of the third gimbal component.

A gimbal component earlier in the series (e.g., upstream) may affect a position or rotation of gimbal components later in the series. Affecting a position or rotation of other components may be referred to herein as supporting, or driving the other components. A gimbal component earlier in the series may support or drive a gimbal component later in the series. A gimbal component later in the series may or may not affect a position or rotation of gimbal components earlier in the series. A gimbal component later in the series may or may not support or drive a gimbal component earlier in the series. For example, the first gimbal component may actuate and rotate the second gimbal component and/or the third gimbal component about a longitudinal axis of the first actuator. For example, the second gimbal component and the third gimbal component actuating may not affect a position or rotation of the first gimbal component.

A gimbal component earlier in the series (e.g., upstream) may hold in place, or support a weight of gimbal components later in the series. Holding in place or supporting a weight of other components may be referred to herein as supporting, or holding the other components. A gimbal component earlier in the series may support a weight of, or hold in place a gimbal component later in the series. A gimbal component later in the series may or may not support a weight of, or hold in place gimbal components earlier in the series. For example, without the first gimbal component, the second, third, and/or payload may fall to the ground. However, without the second gimbal component, the first gimbal component may remain in place (e.g., coupled to a UAV).

Figure 5:
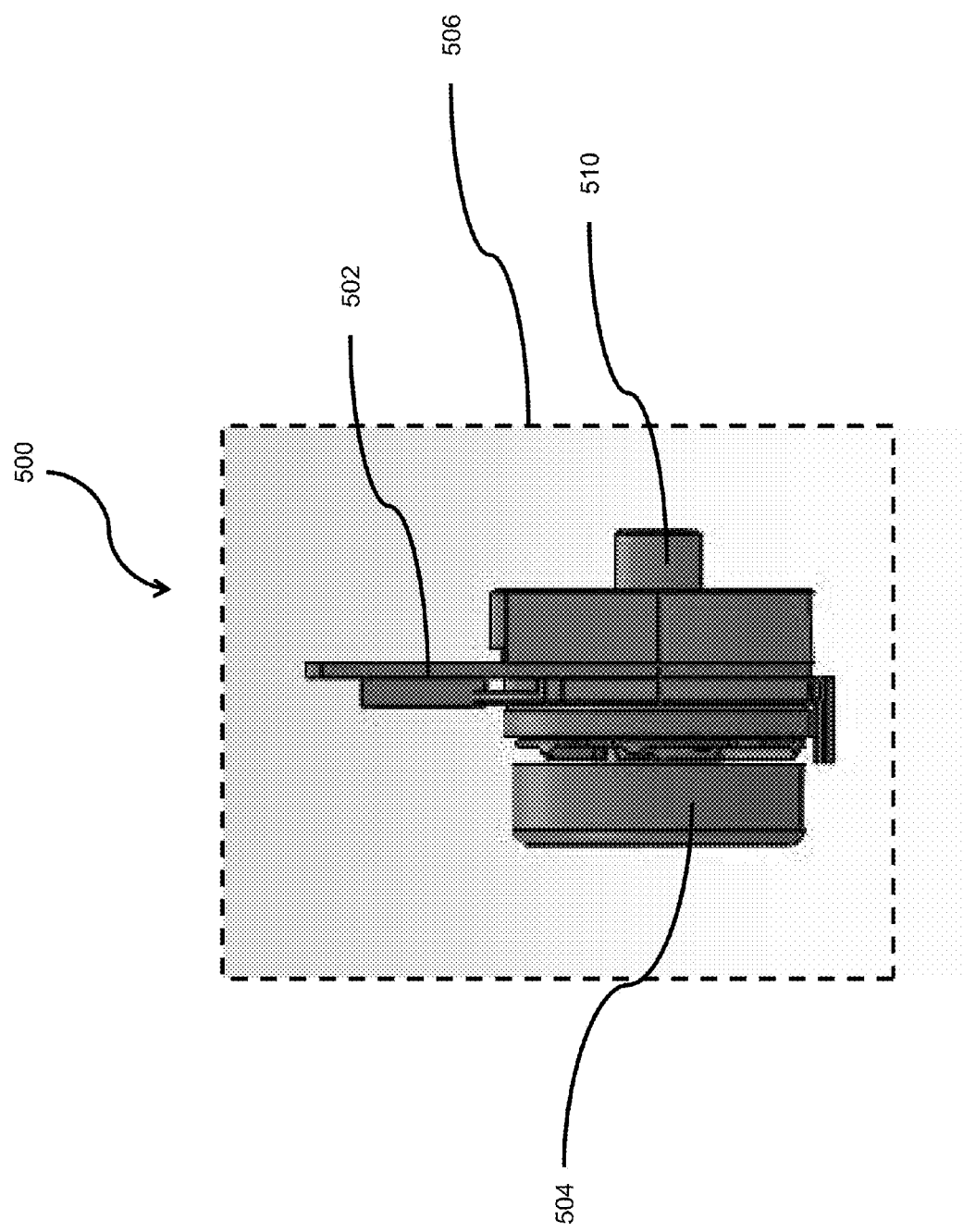
FIG. 5 illustrates an isolated first gimbal component, in accordance with embodiments.

FIG. 5 illustrates an isolated first gimbal component, in accordance with embodiments. In some instances, the first gimbal component may be an isolated first gimbal component 202 of FIG. 2. The first gimbal component 500 may comprise a first frame 502 and first actuator 504. The first frame may comprise a rectangular shape, as illustrated by outline 506. The first frame may be substantially linear in shape. In some instances, the gimbal component may comprise an intermediary frame. The intermediary frame may change a shape of the first gimbal component.

In some instances, the first frame may support subsequent components from multiple sides. Alternatively, the first frame may be shaped and/or configured to support subsequent components from a single side.

The first gimbal component may be configured to be coupled to an external component (e.g., of a device such as a vehicle) or configured to be held by a user. In some instances, the first frame may comprise handles (e.g., configured to be held by a user). In some instances, the first frame may comprise a one or more terminal ends 510. The terminal ends may be configured to directly connect to an external component or device (e.g., vehicles, handheld frame assemblies, etc.). In some instances, each of the terminal ends of the first gimbal component may be configured to be mechanically couple with a complementary set of terminal ends (e.g., set of shafts). For example, each of the terminal ends may comprise a male and/or female connector (e.g., sockets, fasteners, etc) and the set of shafts may comprise corresponding female and/or female connectors. In some instances, the terminal ends of the first gimbal component may be configured to be coupled with the external device (e.g., UAV) via mechanical fasteners, adhesives, and one or more mating connections. Each of the terminal ends may comprise one, two, three, four, five, six, seven, eight or more contact points.

In some instances, the first gimbal component may be coupled to the external device indirectly, for example via an adaptor or intermediary components. The adapter can comprise one or more mechanical fasteners configured to fasten the first gimbal component onto the external device, or one or more adhesive surfaces configured to adhere to a surface of the external device.

Alternatively or in combination, the adapter can comprise a mounting structure coupled to the adapter, the mounting structure configured to securely couple to the external device, for example via mechanical fasteners, adhesives, or one or more mating connections. While FIG. 5 illustrates a first gimbal component comprising a single terminal end, it is to be understood that there may be one, two, three, four, five, six or more terminal ends configured to be coupled to an external component or device such as a UAV.

The first gimbal component may be configured to be coupled to a second gimbal component. For example, the first frame (e.g., of the first gimbal component) may comprise a mating feature. The mating feature may be configured to connect to a complimentary mating feature provided on the second frame (e.g., of the second gimbal component) to form a connection between the first frame and the second frame. The first gimbal component may be directly connected to the second gimbal component. In some instances, the first gimbal component may be indirectly connected to the second gimbal component (e.g., using adaptors described above). The first and second gimbal components may be removably connected (e.g., with the mating feature). The first and second gimbal components may be permanently connected. For example, the first actuator 504 may be configured to be coupled to the second gimbal component. In some instances, the first actuator may be configured to be coupled to an intermediary frame component. The intermediary frame component may be further configured to be coupled to the second gimbal component. In some instances, the first gimbal component comprises a mating feature and the intermediary frame component comprises a complementary mating feature to form a connection between the first gimbal component and the intermediary frame component.

The first gimbal component may be configured to drive or support the second gimbal component, the third gimbal component, and/or the payload. A gimbal component may drive or support a component or an object if actuation (e.g., of the actuator) of the gimbal component affects a rotational or translational position of another component or an object. A gimbal component may support a component or an object if the gimbal component holds the other component or object in place. In some instances, the terms "support" or "drive" may be used for downstream support of gimbal components in the context of supporting a payload, previously described throughout.

Actuation of the first gimbal component (e.g., first actuator) may rotate components coupled to the first actuator about the longitudinal axis of the first actuator, also referred to herein as the first rotational axis. For example, the first gimbal component may be configured to permit rotation of a payload about the first rotational axis. For example, the first gimbal component may be configured to permit rotation of an intermediary frame component, a second gimbal component and/or a third gimbal component located downstream about the first rotational axis. In some instances, the first rotational axis may be, or align with a pitch axis. In some instances, the first rotational axis may be, or align with a yaw axis. In some instances, the first rotational axis may be, or align with a roll axis. The first gimbal component may be configured to permit rotation of the payload of equal to about 30°, 45°, 60°, 90°, 120°, 150°, 180°, 210°, 240°, 270°, 300°, 330°, or 360° about the first rotational axis (e.g., pitch axis). The first gimbal component may be configured to permit rotation of the payload greater than about 30°, 45°, 60°, 90°, 120°, 150°, 180°, 210°, 240°, 270°, 300°, 330°, or 360° about the first rotational axis (e.g., pitch axis). The first gimbal component may be configured to permit rotation of the payload less than about 30°, 45°, 60°, 90°, 120°, 150°, 180°, 210°, 240°, 270°, 300°, 330°, or 360° about the first rotational axis (e.g., pitch axis).

Figure 6:
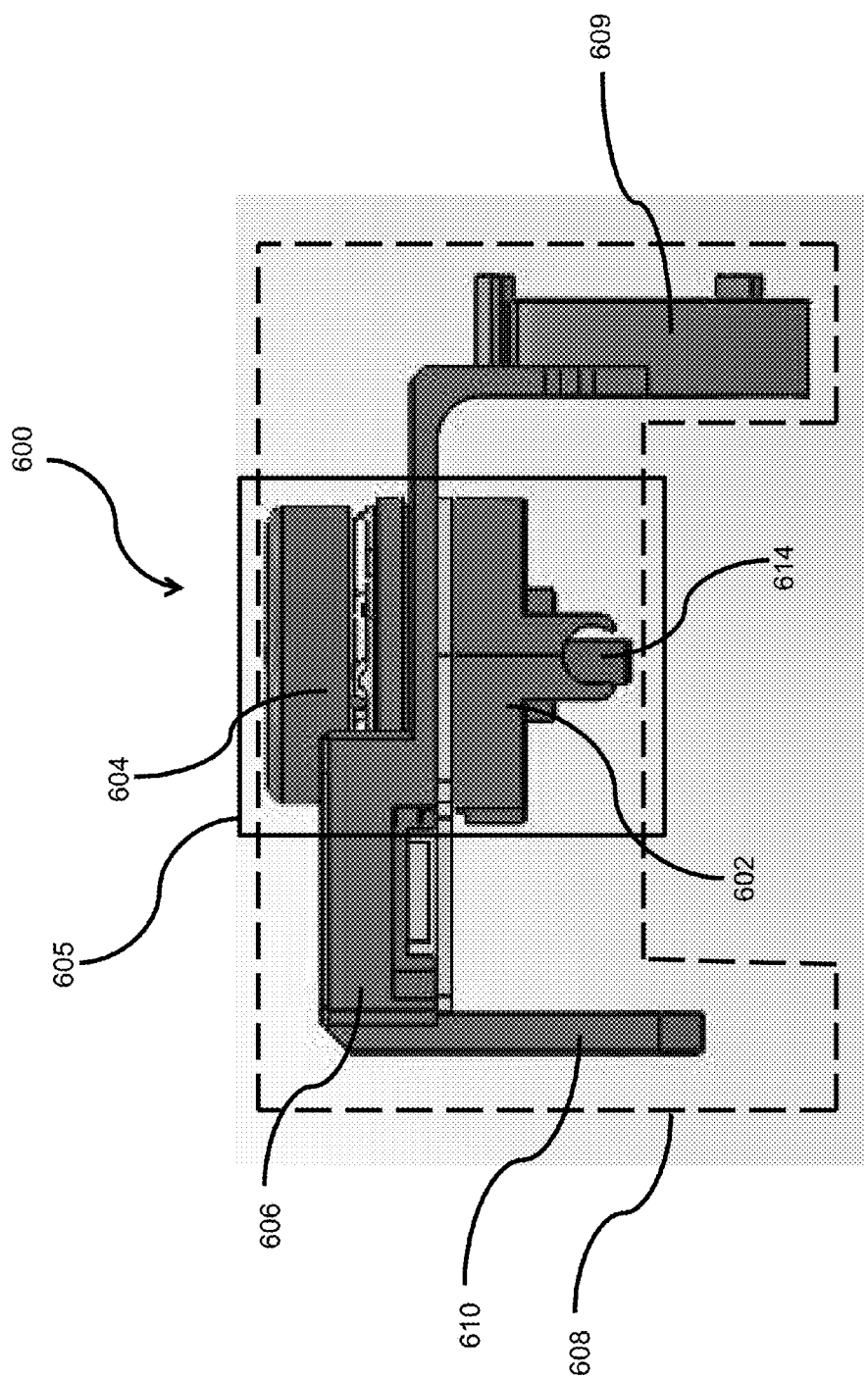
FIG. 6 illustrates an isolated second gimbal component, in accordance with embodiments.

FIG. 6 illustrates an isolated second gimbal component, in accordance with embodiments. In some instances, the second gimbal component may be an isolated second gimbal component 204 of FIG. 2. The second gimbal component 600 may comprise a second frame 602 and a second actuator 604. The second frame may comprise a rectangular shape, as illustrated by outline 605. The second frame may be substantially linear in shape. In some instances, the second gimbal component may comprise an intermediary frame 606. In such a case, the second gimbal may comprise a c-shaped yoke as illustrated by outline 608. An intermediary frame may change a shape of the gimbal component. A second frame as referred to herein may refer to the second frame 602 and/or the intermediary frame 606. In some instances, the intermediary frame may be a separate component distinct from the second gimbal component to which the second gimbal component may be coupled with.

In some instances, the second frame may support subsequent components from multiple sides. Alternatively, the second frame may be shaped and/or configured to support subsequent components from a single side.

The second gimbal component may be configured to be coupled to the first gimbal component. In some instances, the second gimbal component may be directly connected to the first gimbal component. In some instances, the second gimbal component may be indirectly connected to the first gimbal component (e.g., using an adaptor or an intermediary frame component). The second gimbal may be removably coupled to the first gimbal component. The second gimbal component may be permanently coupled to the first gimbal component. In some instances, the first gimbal component comprises a mating feature and the second gimbal component comprises a complementary mating feature 609 to form a connection between the first gimbal component and the second gimbal component. In some instances, the intermediary frame component comprises a mating feature and the second gimbal component comprises a complementary mating feature to form a connection between the intermediary frame component and the second gimbal component. For example, mating feature 609 may be configured to be coupled to, or receive, the first gimbal component (e.g., first actuator).

The second gimbal component may be configured to be coupled to an external support structure (e.g., of a device such as a vehicle) or configured to be held by a user. In some instances, the second frame may comprise handles (e.g., configured to be held by a user). In some instances, the second frame may comprise one or more terminal ends 610. The terminal ends may be configured to directly connect to an external component or device (e.g., vehicles, handheld frame assemblies, etc.). In some instances, each of the terminal ends of the first gimbal component may be configured to be mechanically couple with a complementary set of terminal ends, substantially as described with respect to the first gimbal component. For example, each of the terminal ends may comprise a male and/or female connector (e.g., sockets, fasteners, etc) and the set of shafts may comprise corresponding female and/or female connectors. In some instances, the terminal ends of the second gimbal component may be configured to be coupled with the external device (e.g., UAV) via mechanical fasteners, adhesives, and one or more mating connections. Each of the terminal ends may comprise one, two, three, four, five, six, seven, eight or more contact points.

In some instances, the second gimbal component may be coupled to the external device indirectly, for example via an adaptor or intermediary components. The adapter can comprise one or more mechanical fasteners configured to fasten the second gimbal component onto the external device, or one or more adhesive surfaces configured to adhere to a surface of the external device.

Alternatively or in combination, the adapter can comprise a mounting structure coupled to the adapter, the mounting structure configured to securely couple to the external device, for example via mechanical fasteners, adhesives, or one or more mating connections. While FIG. 6 illustrates a first gimbal component comprising a single terminal end, it is to be understood that there may be one, two, three, four, five, six or more terminal ends configured to be coupled to an external component or device such as a UAV.

The second gimbal component may be supported by the first gimbal component. For example, actuation of the first gimbal component may rotate the second gimbal component about a pitch axis. The second gimbal component may be configured to drive or support a third gimbal component and/or a payload.

The second gimbal component may be configured to be coupled to a third gimbal component. For example, the second frame (e.g., of the second gimbal component) may comprise a mating feature 614. The mating feature may be configured to connect to a complimentary mating feature provided on a third frame (e.g., of a third gimbal component) to form a connection between the second frame and the third frame. The second gimbal component may be directly connected to the third gimbal component. The second gimbal component may be indirectly connected to the third gimbal component (e.g., connected via an adaptor as described elsewhere). The second and third gimbal components may be removably connected (e.g., with the mating feature). The second and third components may be permanently connected.

Actuation of the second gimbal component (e.g., second actuator) may rotate components coupled to the second actuator about the longitudinal axis of the second actuator, also referred to herein as the second rotational axis. For example, the second gimbal component may be configured to permit rotation of a payload about the second rotational axis. For example, the second gimbal component may be configured to permit rotation of a third gimbal component about the second rotational axis. In some instances, the second rotational axis may be, or align with a yaw axis. In some instances, the second rotational axis may be, or align with a pitch axis. In some instances, the second rotational axis may be, or align with a roll axis. The second rotational axis may be different from the first rotational axis. The second rotational axis may be same as that of the first rotational axis. The second rotational axis may be orthogonal to the first rotational axis. The second gimbal component may be configured to permit rotation of the payload of equal to about 30°, 45°, 60°, 90°, 120°, 150°, 180°, 210°, 240°, 270°, 300°, 330°, or 360° about the second rotational axis (e.g., the yaw axis). The second gimbal component may be configured to permit rotation of the payload greater than about 30°, 45°, 60°, 90°, 120°, 150°, 180°, 210°, 240°, 270°, 300°, 330°, or 360° about the second rotational axis (e.g., the yaw axis). The second gimbal component may be configured to permit rotation of the payload less than about 30°, 45°, 60°, 90°, 120°, 150°, 180°, 210°, 240°, 270°, 300°, 330°, or 360° about the second rotational axis (e.g., the yaw axis).

Figure 7:
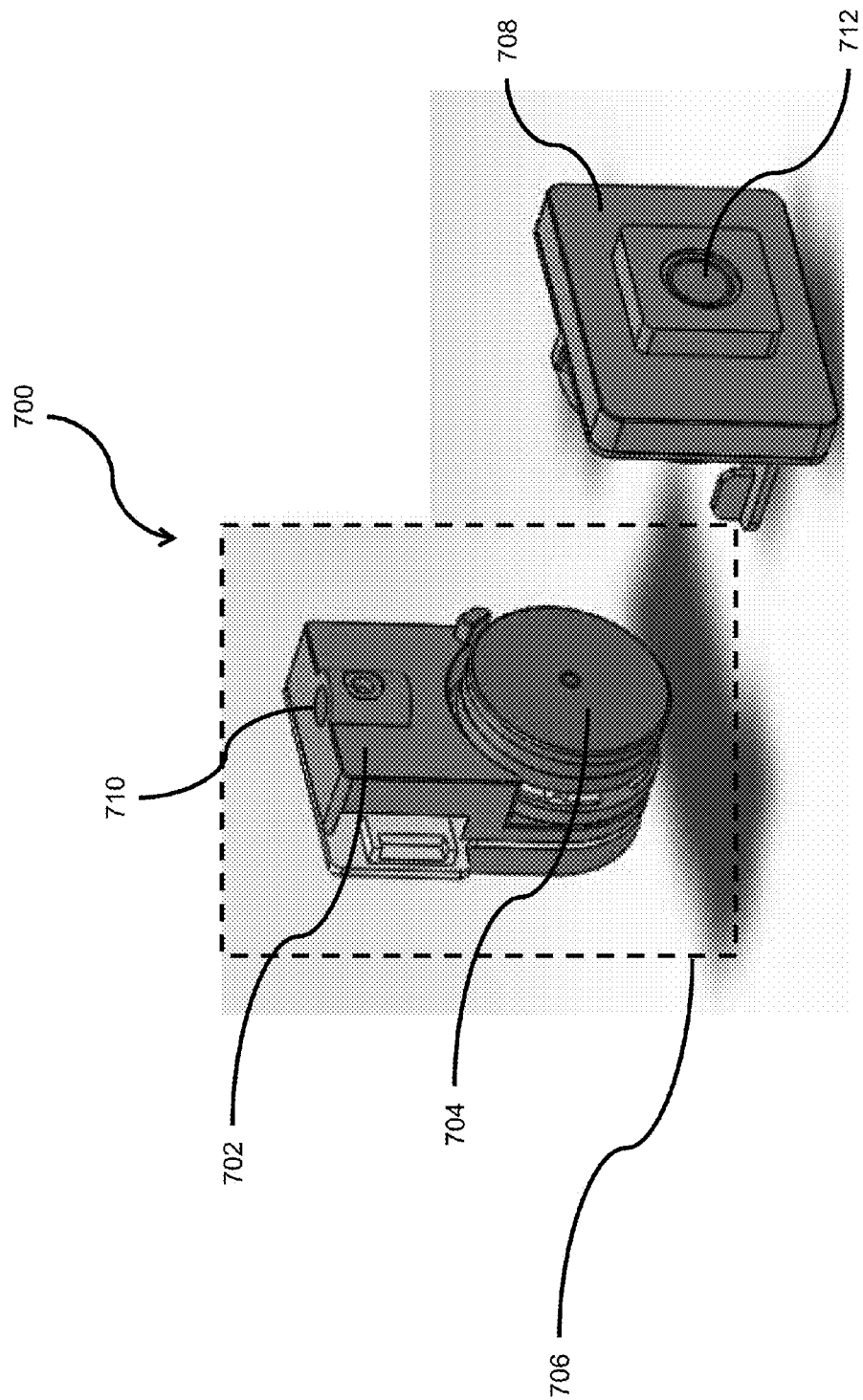
FIG. 7 illustrates an isolated third gimbal component, in accordance with embodiments.

FIG. 7 illustrates an isolated third gimbal component, in accordance with embodiments. In some instances, the third gimbal component may be an isolated third gimbal component 206 of FIG. 2. The third gimbal component 700 may comprise a third frame 702 and a third actuator 704. The third frame may comprise a rectangular shape, as illustrated by outline 706. The third frame may be substantially linear in shape. In some instances, the third gimbal component may comprise an intermediary frame 708. An intermediary frame may change a shape of the gimbal component. A third frame as referred to herein may refer to the third frame 702 and/or the intermediary frame 708. In some instances, the intermediary frame may be a separate component distinct from the third gimbal component to which the third gimbal component may be coupled with. The intermediary frame may be used to receive or be coupled with a payload. An intermediary frame used to receive or be coupled with a payload may be referred to as a coupling plate henceforth.

In some instances, the third frame may support subsequent components from multiple sides. Alternatively, the third frame may be shaped and/or configured to support subsequent components from a single side.

The third gimbal component may be configured to be coupled to the second gimbal component. In some instances, the third gimbal component may be directly connected to the second gimbal component. In some instances, the third gimbal component may be indirectly connected to the second gimbal component. The third gimbal may be removably coupled to the second gimbal component. The third gimbal component may be permanently coupled to the second gimbal component. In some instances, the second frame comprises a mating feature and the third frame comprises a complementary mating feature 710 to form a connection between the second frame and the third frame.

The third gimbal component may be configured to receive a payload. The third gimbal component may be configured to be coupled to a payload, and the payload may be configured to be coupled to the third gimbal component. In some instances, the third gimbal component may comprise a coupling plate 708 for receiving the payload. The coupling plate may be directly connected to the third gimbal component. The coupling plate may be indirectly connected to the third gimbal component. The coupling plate may be removably coupled to the third gimbal component. The coupling plate may be permanently coupled to the third gimbal component. In some instances, the coupling plate comprises a mating feature and the third gimbal component comprises a complementary mating feature to form a connection between the coupling plate and the third gimbal component. In some instances, the payload may be connected directly to the third actuator 704 without a coupling plate. In some instances, the coupling plate may comprise the payload, such as a camera. For example, the coupling plate may comprise a lens 712 and an image sensor for capturing images. As referred to herein, the third gimbal component may refer to the third gimbal component together with the coupling plate (e.g., comprising the coupling plate).

The payload may be securely held by the third gimbal component. For example, the connection between the payload and the third gimbal component may be secure enough such that no amount of wind force, vibrations, and/or or turbulence may detach the payload from the third gimbal component.

The payload may be held still relative to the coupling plate and/or the third actuator. The payload may be configured to mechanically lock into the third frame (e.g., via the coupling plate or directly onto the third actuator). In some instances, the payload may be placed on the third gimbal component (e.g., the coupling plate or the third actuator) using a single motion. For example, the third gimbal component and components on a payload may comprise complementary sections (e.g., female and male connectors, fasteners, sockets, etc) which may be used for 1-click coupling. In some instances, the payload may be configured to mechanically lock into the third gimbal component (e.g., the coupling plate, third actuator, and/or third frame) after aligning the payload with the actuator and/or coupling plate and subsequent rotation. In some instances, the payload may be configured to mechanically lock into the third frame component and/or third actuator using a snap on mechanism. In some instances, the payload may be configured to mechanically lock into the third frame component and/or third actuator using a slide on mechanism. In some instances, the payload may be configured to mechanically lock into the third frame component and/or third actuator using one or more clamps.

The third gimbal component may comprise a single contact point for receiving the payload (e.g., one mating connection port). In some instances, the third gimbal component may comprise multiple contact points for receiving the payload (e.g., multiple mating connection ports). In some instances, the payload may comprise a single unit that is configured to attach to or be removed from the third gimbal component. In some instances, the payload may comprise a plurality of units that may be separable from one another. In some instances, the plurality of units may be configured to separably be received by the third gimbal at different contact points. In some instances, additional gimbal components may be configured to receive the payload.

The payload may be positioned below the first frame when the payload is fitted in the third frame (e.g., the coupling plate). The payload may be positioned in front of the third frame when the payload is fitted in the third gimbal component (e.g., third frame). The payload may be positioned below the second gimbal component when the payload is fitted in the third gimbal component (e.g., third frame). The payload may be positioned in front of the gimbal (e.g., first, second, and third frame) when the payload is fitted in the third gimbal component (e.g., third frame).

The payload may be coupled to the third gimbal component directly, for example via mechanical fasteners, adhesives, screws, magnets, or one or more mating connections. Alternatively, the payload may be coupled to the third gimbal component indirectly, for example via an adapter. The adapter can comprise one or more mechanical fasteners configured to fasten the payload onto the adapter, or one or more adhesive surfaces configured to adhere to a surface of the payload. Alternatively or in combination, the adapter can comprise a mounting structure coupled to the adapter, the mounting structure configured to securely couple to the payload, for example via mechanical fasteners, adhesives, or one or more mating connections. Alternatively or in combination, the adapter can comprise an enclosing structure coupled to the adapter, configured to enclose the payload therein so as to securely engage the payload.

The third gimbal component may be further configured to disconnect from, or release the payload. In some instances, the third frame component may be configured to disconnect from the payload using a quick release mechanism. The quick release mechanism may be configured to separate the third frame component from the payload under a single motion. For example, the third frame component may comprise a button or a protrusion. By pushing the button (or the protrusion), the payload may be decoupled (e.g., released) from the third frame. In some instances, the quick release mechanism may be configured to release the payload from the third frame using two or more motions. For example, pushing a protrusion on the third frame may release a lock (e.g., mechanical lock) coupling the third frame to the payload and a subsequent force may be required to physically separate the third frame from the payload. For example, the quick release mechanism may be implemented by pushing a button on the third frame and sliding the payload out from the third frame. For example, the quick release mechanism may be implemented by pushing a button on the third frame, and pulling the payload from the third frame (e.g., the coupling plate). For example, the quick release mechanism may be implemented by pushing a button on the third frame, rotating the payload, and subsequently pulling out the payload from the third frame. Alternatively, the payload may be permanently coupled to the third gimbal component and may be not removable.

The third gimbal component may be supported (e.g., driven) by the first gimbal component and/or the second gimbal component. For example, actuation of the first gimbal component may rotate the third gimbal component about a pitch axis. For example, actuation of the second gimbal component may rotate the third gimbal component about a yaw axis. The third gimbal component may be configured to drive or support the payload.

Actuation of the third gimbal component (e.g., second actuator) may rotate components coupled to the third actuator about the longitudinal axis of the third actuator, also referred to herein as the third rotational axis. For example, the third gimbal component may be configured to enable or permit rotation of a payload about the third rotational axis. In some instances, the third rotational axis may be, or align with a roll axis. In some instances, the third rotational axis may be, or align with a pitch axis. In some instances, the third rotational axis may be, or align with a yaw axis. The third rotational axis may be different from the first rotational axis. The third rotational axis may be same as that of the first rotational axis. The third rotational axis may be different from the second rotational axis. The third rotational axis may be same as that of the second rotational axis. The third rotational axis may be different from the first rotational axis and the second rotational axis. The third rotational axis may be same as that of the first rotational axis but different from the second rotational axis. The third rotational axis may be same as that of the second rotational axis but different from the first rotational axis. The third rotational axis may be different from both the first rotational axis and the second rotational axis. The third rotational axis may be orthogonal to both the first rotational axis and the second rotational axis.

The third gimbal component may be configured to permit rotation of the payload equal to about 30°, 45°, 60°, 90°, 120°, 150°, 180°, 210°, 240°, 270°, 300°, 330°, or 360° about the third rotational axis (e.g., the roll axis). The third gimbal component may be configured to permit rotation of the payload greater than about 30°, 45°, 60°, 90°, 120°, 150°, 180°, 210°, 240°, 270°, 300°, 330°, or 360° about the third rotational axis (e.g., the roll axis). The third gimbal component may be configured to permit rotation of the payload less than about 30°, 45°, 60°, 90°, 120°, 150°, 180°, 210°, 240°, 270°, 300°, 330°, or 360° about the third rotational axis (e.g., the roll axis). In some instances, the third gimbal component may be configured to permit more than or equal to a 90 degree rotation of the payload about a roll axis. In some instances, the third gimbal component may be configured to permit rotation of the payload about a roll axis of greater than 90 degrees.

Figure 8:
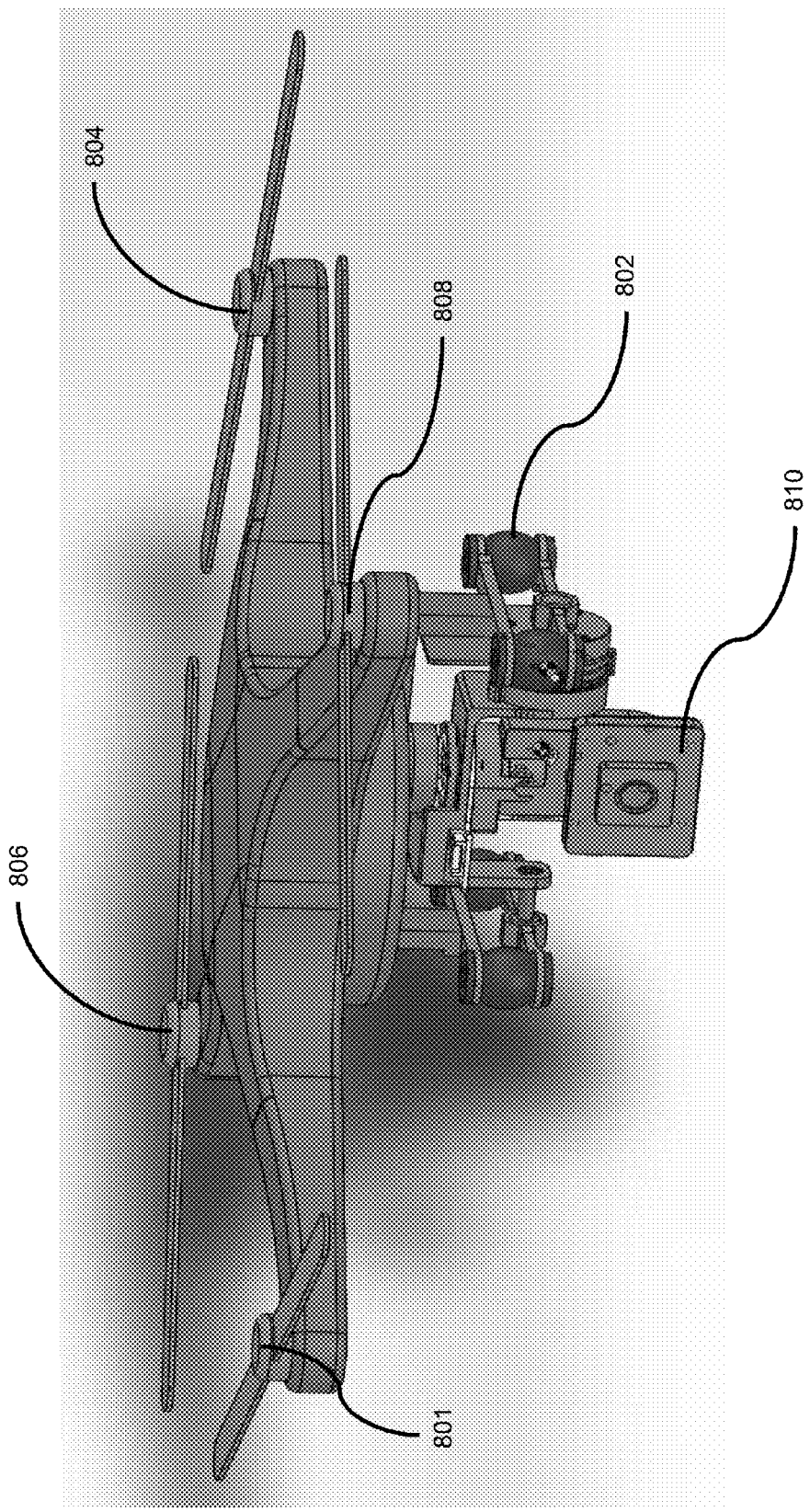
FIG. 8 illustrates a gimbal mounted to an unmanned aerial vehicle, in accordance with embodiments

FIG. 8 illustrates a gimbal mounted to an unmanned aerial vehicle, in accordance with embodiments. The first gimbal component may be coupled (e.g., mounted) to the unmanned aerial vehicle (e.g., UAV). The second gimbal component may be coupled (e.g., mounted) to the UAV. Any description herein of a vehicle or an unmanned aerial vehicle may apply to any type of external device that may function as a supporting structure of the gimbal. In some instances, the first frame may be mounted to the vehicle via an intermediary system. The intermediary system may reduce effects of motions of the vehicle to the gimbal. This may include translational motions and/or rotational motions.

The intermediary system may be a vibration dampening system 802. The vibration dampening system may be configured to vibrationally isolate the gimbal from the vehicle. The vibration dampening system may be configured to reduce the effect of vibrations of the vehicle on the gimbal. This may result in a greater than or equal to 10%, 20%, 30%, 40%, 50%, 60%, 70%, 80%, 90%, 95%, 99%, or 99.9% reduction. In some instances, the vibration dampening system may be configured to reduce or remove effects of high frequency vibrations of the vehicle (e.g., greater than 2 Hz, 3 Hz, 5 Hz, 10 Hz, 20 Hz, 30 Hz, 40 Hz, or 50 Hz), by any amount as described herein. The vibration dampening system may stabilize the gimbal, the payload, and/or the UAV.

In some instances, the vibrational dampening system may comprise a plurality of elastomers configured to stabilize the payload, gimbal, and/or the UAV. For example, one, two, three, four, five, six, seven, eight, nine, ten or more circular elastomers may be provided. The circular elastomers may connect the UAV to a rigid frame configured to directly connect to the gimbal. The vibrational dampeners may be used to support the gimbal as the term has been used throughout. For example, the vibrational dampeners may support a weight of the gimbal (e.g., and the payload). For example, the vibrational dampeners may hold the gimbal in place. In some instances, the vibrational dampening system may comprise springs. The vibrational dampeners may minimize vibrational motions (e.g., shaking) caused by operation of propulsion units 804, 806, 808, 810. For example, the vibrational dampeners may absorb vibrational energy generated (e.g., kinetic energy) and convert it to thermal energy, thereby stabilizing the system (e.g., UAV, gimbal, and/or payload).

While the gimbal is shown located below the UAV, systems and methods provided herein may be equally applicable to gimbals located above or on a side of the UAV. The gimbal disclosed herein may be mounted on an upper surface of the UAV, a lower surface of the UAV, on top of or below a central body of the UAV, on top of or below a peripheral portion of the UAV, and the like. While the gimbal is shown located substantially near the center of the UAV, it is to be understood that the gimbal may be located anywhere on the UAV (e.g., near the center, near the edge, etc.).

In some instances, external components or devices to which the gimbal is coupled to may hinder or restrict the extent to which the payload is able to rotate around rotational axes, such as the roll, pitch, or yaw axes. For example, when coupled to an unmanned aerial vehicle, the first gimbal component may be configured to permit rotation of the payload equal to about 30°, 45°, 60°, 90°, 120°, 150°, 180°, 210°, 240°, 270°, or 300° about the pitch, yaw, and/or roll axes. For example, when coupled to an unmanned aerial vehicle, the first gimbal component may be configured to permit rotation of the payload greater than about 30°, 45°, 60°, 90°, 120°, 150°, 180°, 210°, 240°, 270°, or 300° about the pitch, yaw, and/or roll axes. For example, when coupled to an unmanned aerial vehicle, the first gimbal component may be configured to permit rotation of the payload less than about 30°, 45°, 60°, 90°, 120°, 150°, 180°, 210°, 240°, 270°, or 300° about the pitch, yaw, and/or roll axes.

The carrier described herein may permit stabilization of the payload. Stabilization may be required or beneficial while a payload is in motion. In some instances, the payload (e.g., carrier supporting the payload) may be carried by a human being in motion (e.g., walking, in a vehicle, etc). In some instances, the payload may be coupled to a vehicle (e.g., UAV) that is in motion.

Stabilization of the payload may be accomplished with aid of one or more inertial sensors. In some instances, the stabilization may be accomplished with aid of an inertial measurement unit (IMU). Any description herein of an IMU may apply to one or more inertial sensors. An IMU may be coupled to the payload. An IMU may be coupled to the gimbal. The IMU may be coupled to any portion of the gimbal. For example, for a gimbal comprising three gimbal components, the IMU may be coupled to a first gimbal component, a second gimbal component, and/or a third gimbal component. In some instances, the IMU may be coupled to a frame of the first, second, or third gimbal components. The IMU may be in communication with one or more actuators of the gimbal. The actuators may include sensing components which may form portions of or in be in communication with the IMU. Alternatively or in conjunction, the IMU may be coupled to the vehicle on which the carrier is mounted on (e.g., UAV).

The IMU may comprise inertial sensors, such as accelerometers, gyroscopes, and/or magnetometers. IMUs may detect a rate of acceleration or detect changes in rotational attributes such as pitch, roll, and yaw. The IMU may detect the aforementioned without sending a signal out to the environment and/or receiving a signal back. The change may be relative to a reference. For example, the change may be relative to the environment or a direction of gravity. IMUs, or one or more processors coupled to the IMUs may calculate a current position of the payload, carrier, and/or vehicle. The IMUs, or one or more processors coupled to the IMUs may calculate a change in position of the payload, carrier, and/or vehicle. A controller may receive data from the IMU and output command signals to the actuators.

A controller may receive signals (e.g., input signals) and output command signals. For example, the controller may receive input signals from the aforementioned sensors (e.g., Hall sensor) and/or users. Based on the received signals, the controller may output commands to actuators, e.g., to actuate. The controller may be located on-board a gimbal, a support structure (e.g., UAV), and/or payload. A controller may communicate receive and output signals via a wired or wireless connection. For example, an actuator may have receiver and to receive output signals from the controller. Alternatively or in conjunction, other portions of the gimbal may have receiver, or UAV may receive signal and send hardwired signals down to the actuators.

The controller may be distributed over multiple components. For example, part of the controller may be located on board the gimbal and part of the controller may be located on the payload. In some instances, more than one controller may work in conjunction. The plurality of controllers may be located on the same or different components. Alternatively or in conjunction, the controller may be off-board. For example, the controller may be located off-board on a device such as a remote control device, ground station, server, or cloud computing infrastructure.

The controller may send a signal or signals to one or more actuators that causes actuation of the actuators. Output signals by the controller may control a degree of actuation, position, velocity, acceleration of the actuator, and/or torque produced by the actuator. The output signals by the controller may effect actuation of a single gimbal component (e.g., single actuator) or a plurality of gimbal components (e.g., plurality of actuators). Output signals from the controller may effect actuation of a plurality of actuators, e.g., in sequence or in parallel (e.g., simultaneously).

The actuation may maintain an orientation of the IMU and the payload may be stabilized. The system (e.g., IMU, gimbal, and one or more processors) may be configured such that the actuator (e.g., motor) actuates in response to an unwanted movement (e.g., vibrations and shaking). The system may be configured such that the actuator (e.g., motor) does not actuate in response to a deliberate movement.

The carrier may permit deliberate movement of the payload. In some instances, a user may directly control a position of the gimbal and/or the payload as desired. For example, a user may deliberately control actuation of each of the gimbal components. In some instances, a physical control device may be provided. The physical control device may comprise a mobile device such as a cell phone, PDA, tablet, computer, remote controller, etc. The mobile device may comprise a display, such as a touch screen display. In some instances, a user may access control of individual gimbal components through an application on the control device. In some instances, physical buttons or features may be provided on the remote control device corresponding to each of the gimbal components (e.g., actuators). The user may actuate each of the gimbal components and control a degree of actuation (e.g., how much to rotate each of the gimbal components).

For example, the user may set parameters of the actuation for example gimbal component (e.g., torque produced, acceleration, velocity, position of the actuator, etc). Actual actuation may be implemented by a controller (e.g., automatically or semi-automatically) or the user may push a button which may affect actuation of a selected actuator. In some instances, a configuration of the remote control device may affect actuation of the gimbal components. For example, tilting or rotating the remote control device may affect actuation of the gimbal components. In some instances, an orientation of the remote control device may correspond to an orientation of the payload. For example, when rotating the remote control device about its roll axis, the payload may be configured to be rotated about its roll axis as well. The torque produced, velocity, acceleration, and/or positional change of the control device may be mimicked by the payload. In some instances, only torque produced above a certain threshold, or angular acceleration above a certain threshold will be recognized by the controller such that the payload may mimic certain changes of the control device but not others.

In some instances, a user may indirectly control a position of the gimbal and/or the payload. For example, a user may provide an input (e.g., on a physical control device) and a controller (e.g., microcontroller) coupled to the gimbal may control a configuration of the gimbal. For example, a user may input a desired orientation of the gimbal or the payload. The desired orientation of the payload may be a vertical orientation. The desired orientation of the payload may be a horizontal orientation. The desired orientation of the payload may be an arbitrary orientation between the vertical and horizontal orientation. The vertical or horizontal orientation of the payload as used herein may refer to an orientation of the payload relative to a roll, pitch, and/or yaw axes. For example, an upright position of the payload (e.g., at a resting state) may be a horizontal orientation of the payload. For example, an orientation of the payload rotated 90° about the roll axis relative to the horizontal orientation may be a vertical orientation of the payload. While an orientation relative to the roll axis has been described, the descriptions may be equally applicable with respect to the pitch axis or the yaw axis.

In some instances, an orientation of the payload may be with respect to the environment (e.g., the ground). In some instances, an orientation of the payload may be relative to a structure of the gimbal (e.g., coupling plate). In some instances, an orientation of the payload may be relative to a support structure or external device to which the gimbal is coupled to. The orientation may be static (e.g., fixed orientation with respect to the environment or UAV). The orientation may be dynamic (e.g., changing). In some instances, a user may specify how an orientation is, and how it may change.

One or more sensors may be further provided. For example, a potentiometer or a Hall sensor may be provided. The one or more sensor may be coupled to the gimbal. For example, a hall sensor may be coupled to a gimbal component, such as a gimbal component configured to mount the payload. The one or more sensors may be coupled to any gimbal component described herein. In some instances, the one or more sensors may be coupled to the actuator or the gimbal component. The one or more sensors may be configured to detect an angle (e.g., rotation angle) of the actuator. The angle of the actuator may be sent to the controller, e.g., in real time or at set intervals. For example, the angle of the actuator may be sent to the controller at about or less than every 0.0001 seconds, 0.0002 seconds, 0.0005 seconds, 0.001 seconds, 0.002 seconds, 0.005 seconds, 0.01 seconds, 0.02 seconds, 0.05 seconds, 0.1 seconds, 0.2 seconds, 0.5 seconds, 1 second, 2 seconds, 5 seconds, 10 seconds, 30 seconds, or 60 seconds. Based on the input (e.g., from the user) and data from the one or more sensors (e.g., sensed degree of rotation), the controller may instruct the motor to actuate in order to rotate the payload. Based on the input (e.g., from the user) and data from the one or more sensors (e.g., sensed degree of rotation), the payload may be rotated to a desired orientation.

In some instances, the payload comprises an imaging device. In some instances, the imaging device may be a camera configured to capture visual images from a field of view. Further, an input by a user may comprise a desired orientation of an image. For example, the user may desire to capture an image with a horizontal orientation, a vertical orientation, or an image having an arbitrary orientation (e.g., diagonal orientation). An image having a horizontal orientation may refer to a landscape image. An image having a vertical orientation may refer to a portrait image. An imaging device may capture an image having a horizontal orientation in a default position (e.g., upright, resting position). For example, while coupled to a carrier at a default state, the imaging device may capture an image having a horizontal orientation. An imaging device may capture an image having a vertical orientation if rotated 90 degrees about the roll axis. For example, in regards to FIG. 8, a camera may be coupled to coupling plate 810 (e.g., in an upright orientation). If the motor of the third gimbal component actuates such that it is rotated 90° about the longitudinal axis of the third motor, the imaging device may capture an image having a vertical orientation. Alternatively, an imaging device may capture an image having a vertical orientation in a default position and may capture an image having a horizontal orientation if rotated 90° about the roll axis.

The desired orientation may be preselected from a plurality of options. For example, the desired orientation may be selected between a horizontal orientation and a vertical orientation. For example, the desired orientation may be selected between a limited number of degrees of angles the imaging device may rotate about a roll axis, e.g., 0 degrees, 30 degrees, 45 degrees, 60 degrees, 90 degrees, 120 degrees, 150 degrees, 180 degrees, etc. In some instances, the desired orientation may be selected along a continuous spectrum (e.g., of angles the imaging device may be rotated about a roll axis). In some instances, a user may input a specific desired orientation (e.g., numerical value of degree of rotation of the payload about a roll axis). In some instances, a user may select a specific desired orientation from a list. In some instances, an option to incrementally change an orientation (e.g., by 15 degrees) may be presented to the user. A sensor (e.g., Hall sensor) previously mentioned may provide information regarding a current orientation of the payload and/or image to be captured by the payload.

A controller may receive the desired orientation of an image to be captured by the imaging device (e.g., camera).

The controller may further receive a degree of rotation of the gimbal component or the actuator (e.g., in real time) from one or more sensors as previously described herein. Based on the desired orientation and/or the sensed degree of rotation of the motor, the controller may instruct the motor to actuate (e.g., either in a clockwise or counterclockwise direction) in order to rotate the imaging device such that an image having a desired orientation may be captured.

The imaging device may retain an orientation used for capturing an image (e.g., not return to a default orientation). The imaging device may return to a default orientation after capturing an image. The imaging device may return to a default orientation after a predetermined period of time. For example, the imaging device may return to a default orientation after about 10 second, 20 second, 30 second, 60 second, 100 seconds, 200 seconds, 300 second, 600 second, 1800 seconds. For example, the imaging device may return to a default orientation after more than about 10 second, 20 second, 30 second, 60 second, 100 seconds, 200 seconds, 300 second, 600 second, 1800 seconds. For example, the imaging device may return to a default orientation after less than about 10 second, 20 second, 30 second, 60 second, 100 seconds, 200 seconds, 300 second, 600 second, 1800 seconds. In some instances, other conditions for returning the imaging device to a default orientation may exist. The other conditions may used as an alternative, or in conjunction to the period of time limitation. For example, the imaging device may return to a default orientation as commanded by a controller. The controller may determine a desired orientation in real time depending on one or more factors such as lighting, amount of time spent in a default orientation, etc.

In some instances, when the payload (e.g., imaging device) is rotated about a roll axis more than or equal to 90°, a field of view of the imaging device is unobstructed. For example, for a carrier mounted on a vehicle such as a UAV, when the imaging device can be rotated about a roll axis about at least 90°, 120°, 150°, 180°, 210°, 240°, 270°, 300°, 330°, or 360°, with no portion of the vehicle may come into a field of view of the imaging device. In some instances, the imaging device may be rotated about a roll axis about at least 90°, 120°, 150°, 180°, 210°, 240°, 270°, 300°, 330°, or 360°, with no gimbal component bumping into each other. In some instances, the imaging device may be rotated about a roll axis about at least 90°, 120°, 150°, 180°, 210°, 240°, 270°, 300°, 330°, or 360°, with no portion of the gimbal coming into a field of view of the imaging device.

In some instances, when the payload (e.g., imaging device) is rotated about a pitch axis more than or equal to 90°, a field of view of the imaging device is unobstructed. For example, for a carrier mounted on a vehicle such as a UAV, when the imaging device can be rotated about a pitch axis about at least 90°, 120°, 150°, 180°, 210°, 240°, 270°, 300°, 330°, or 360°, with no portion of the vehicle may come into a field of view of the imaging device. In some instances, the imaging device may be rotated about a pitch axis about at least 90°, 120°, 150°, 180°, 210°, 240°, 270°, 300°, 330°, or 360°, with no gimbal component bumping into each other. In some instances, the imaging device may be rotated about a pitch axis about at least 90°, 120°, 150°, 180°, 210°, 240°, 270°, 300°, 330°, or 360°, with no portion of the gimbal coming into a field of view of the imaging device.

In some instances, when the payload (e.g., imaging device) is rotated about a yaw axis more than or equal to 90°, a field of view of the imaging device is unobstructed. For example, for a carrier mounted on a vehicle such as a UAV, when the imaging device can be rotated about a yaw axis about at least 90°, 120°, 150°, 180°, 210°, 240°, 270°, 300°, 330°, or 360°, with no portion of the vehicle may come into a field of view of the imaging device. In some instances, the imaging device may be rotated about a yaw axis about at least 90°, 120°, 150°, 180°, 210°, 240°, 270°, 300°, 330°, or 360°, with no gimbal component bumping into each other. In some instances, the imaging device may be rotated about a yaw axis about at least 90°, 120°, 150°, 180°, 210°, 240°, 270°, 300°, 330°, or 360°, with no portion of the gimbal coming into a field of view of the imaging device.

In some instances, an image processing device for processing an image may be provided. The image processing device may receive an orientation of the imaging device (e.g., from the one or more sensors such as a Hall sensor). The one or more sensors may transmit an orientation of the imaging device to the image processing device. Based on the received orientation of the imaging device (e.g., vertical orientation or horizontal orientation), the image processing device may select an orientation of the image (e.g., to be presented to a viewer). The image processing device coupled with the sensors may simplify display of an image. The image processing device may enable correspondence between a plurality of images that are captured.

The configuration of the gimbal components described herein may enable a compact and light gimbal structure. A compact and light gimbal structure may be especially beneficial for mobile use, or when coupling the gimbal to a vehicle such as a UAV, which is usually limited in volume and weight. In some instances, a compact and light configuration may enable the carrier and/or payload to be mounted within a shell of the UAV.

For example, a total volume of space occupied by the gimbal may be about equal to or less than 1000 cm$^3$, 750 cm$^3$, 500 cm$^3$, 400 cm$^3$, 300 cm$^3$, 250 cm$^3$, 200 cm$^3$, 175 cm$^3$, 150 cm$^3$, 125 cm$^3$, 100 cm$^3$, 75 cm$^3$, 50 cm$^3$, 40 cm$^3$, 30 cm$^3$, 20 cm$^3$, 15 cm$^3$, 10 cm$^3$, 5 cm$^3$, or 1 cm$^3$. A volume of space occupied by the gimbal may refer to a space encompassed by outside boundaries of a gimbal. In some instances, a volume of space occupied by the gimbal may refer to an imaginary cube or cuboid that may wholly encompass the gimbal. In some instances, a volume of space occupied by the gimbal may refer to a plurality of cubes or cuboids that may collectively encompass the gimbal. In some instances, a volume of space occupied by the gimbal may refer to a displacement volume when the gimbal is immersed in a fluid.

For example, an area occupied by the gimbal about a two dimensional plane may be equal to or less than 100 cm$^2$, 75 cm$^2$, 50 cm$^2$, 40 cm$^2$, 30 cm$^2$, 25 cm$^2$, 20 cm$^2$, 15 cm$^2$, 9 cm$^2$, 6.25 cm$^2$, 4 cm$^2$, 125 mm$^2$, 100 mm$^2$, 25 mm$^2$, or 1 mm$^2$. The two dimensional plane may refer to a plane defined by the transverse and perpendicular axis of the gimbal. The two dimensional plane may refer to a plane defined by the perpendicular and frontal axis of the gimbal. The two dimensional plane may refer to a plane defined by the frontal and perpendicular axis of the gimbal. For example, FIG. 2 may represent a plane defined by the transverse and perpendicular axis of the gimbal.

For example, a height of the gimbal may be equal to about or less than 100 mm, 90 mm, 80 mm, 70 mm, 65 mm, 60 mm, 55 mm, 50 mm, 45 mm, 40 mm, 35 mm, 30 mm, 25 mm, 20 mm, 15 mm, 10 mm, 5 mm, or 1 mm. For example, a width of the gimbal may be equal to about or less than 100 mm, 90 mm, 80 mm, 70 mm, 65 mm, 60 mm, 55 mm, 50 mm, 45 mm, 40 mm, 35 mm, 30 mm, or 25 mm, 20 mm, 15 mm, 10 mm, 5 mm, or 1 mm. For example, a length of the gimbal may be equal to about or less than 100 mm, 90 mm, 80 mm, 70 mm, 65 mm, 60 mm, 55 mm, 50 mm, 45 mm, 40 mm, 35 mm, 30 mm, or 25 mm, 20 mm, 15 mm, 10 mm, 5 mm, or 1 mm.

In some instances, a dimension of the gimbal may be less than about 100 mm by 100 mm by 100 mm. In some instances, a dimension of the gimbal may be less than about 80 mm by 80 mm by 80 mm. In some instances, a dimension of the gimbal may be less than about 60 mm by 60 mm by 60 mm. In some instances, a dimension of the gimbal may be less than about 50 mm by 50 mm by 50 mm. In some instances, a dimension of the gimbal may be less than about 40 mm by 40 mm by 40 mm. In some instances, a dimension of the gimbal may be less than about 30 mm by 30 mm by 30 mm. In some instances, a dimension of the gimbal may be less than about 20 mm by 20 mm by 20 mm. In some instances, a dimension of the gimbal may be less than about 10 mm by 10 mm by 10 mm. In some instances, a dimension of the gimbal may be less than about 60 mm by 40 mm by 60 mm.

In some instances, the gimbal may have a volume that is equal to about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times a volume of the payload. In some instances, the gimbal may have a volume that is less than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times a volume of the payload. In some instances, the gimbal may have a volume that between about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times a volume of the payload. In some instances, the gimbal may have a volume that is no more than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times a volume of the payload. The volume of the payload may be defined similarly as to that of the gimbal.

In some instances, the gimbal may have an area (e.g., occupied about a two dimensional plane) that is equal to about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times an area of the payload. In some instances, the gimbal may have an area that is less than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times an area of the payload. In some instances, the gimbal may have an area that between about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times an area of the payload. In some instances, the gimbal may have an area that is no more than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, 5 times, 6 times, 7 times, 8 times, 9 times, or 10 times an area of the payload. The area of the payload may be defined similarly as to that of the gimbal (e.g., area occupied by the payload about a two dimensional plane defined about a transverse and perpendicular axis of the payload, etc).

In some instances, the gimbal may have a height that is equal to about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a height of the payload. In some instances, the gimbal may have a height that is less than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a height of the payload. In some instances, the gimbal may have a height that between about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a height of the payload. In some instances, the gimbal may have a height that is no more than 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a height of the payload. The limitations recited with respect to height of the gimbal relative to that of the payload may be equally applicable with respect to a width or length of the gimbal.

In some instances, the gimbal may have a weight that is equal to about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. In some instances, the gimbal may have a weight that is less than about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. In some instances, the gimbal may have a weight between about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. In some instances, the gimbal may have a weight that is no more than 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a weight of the payload. A weight of the gimbal may be less than a weight of the camera.

The previously recited limitations of the gimbal with respect to the payload may be equally applicable to a support structure or external device to which the gimbal may be coupled to. For example, the limitations recited with respect to a volume, height, and/or weight of the gimbal relative to the payload may be equally applicable to a UAV. For example, the gimbal may have a height that is equal to about 0.1 times, 0.2 times, 0.3 times, 0.5 times, 0.75 times, 1 times, 1.25 times, 1.5 times, 1.75 times, 2 times, 2.25 times, 2.5 times, 2.75 times, 3 times, 3.5 times, 4 times, or 5 times a height of the UAV.

The gimbal of the present disclosure may be powered (e.g., actuated) by a support structure or an external device (e.g., the UAV). Alternatively, or in conjunction, the gimbal may comprise an autonomous power source (e.g., battery) used to power the gimbal. In some instances, the gimbal may be manually powered.

While a carrier (e.g., gimbal) comprising three components have been described primarily herein, the carrier of the current disclosure may comprise one component, two components, three components, four components, five components, or more components. While a single gimbal component has been described to receive or be coupled to the payload, one, two, three, four, five, or more gimbal components may be configured to receive, or be coupled to the payload. While the gimbal component configured to receive the payload has been described to permit rotation of the payload about a roll axis, the gimbal component configured to receive the payload may permit rotation of the payload about a roll, pitch, or yaw axes.

For example, a gimbal may comprise two gimbal components with the first gimbal component permitting rotation of the payload about a pitch axis or a yaw axis and the second gimbal component permitting rotation of the payload about a roll axis. The second gimbal component may be configured to receive or be coupled to the payload, substantially as described above.

For example, a gimbal may comprise five gimbal components. Three of the five gimbal components may be configured to permit rotation of the payload about a roll, pitch, and yaw axes. The remaining two of the five gimbal components may permit rotation of the payload about additional axes, either perpendicular, parallel to the roll, pitch, and yaw axes. Two of the five gimbal components may be configured to receive, or be coupled to a payload. For example, one of the gimbal components may be configured to directly connect to a payload and permit a 360 degree rotation of the payload about a roll axis while another gimbal component may directly connect to a payload and permit a 360 degree of rotation of the payload about a yaw axis.

The gimbal of the present disclosure may enable rotation of the payload about a roll axis of equal to, or greater than 90 degrees. Having a payload coupled directly to a gimbal component permitting rotation of the payload about a roll axis may provide an ability to rotate the payload by 90 degrees or greater about the roll axis. The ability to provide rotation of 90 degrees or greater about the roll axis can be particularly advantageous for applications of the gimbal in aerial photography, wherein the gimbal is coupled to an aerial vehicle and the payload supported by the gimbal comprises a camera for aerial photography. The ability to provide rotation of 90 degrees or greater about the roll axis may enable capture of vertically oriented images without requiring post-processing of the images. Having a payload coupled directly to a gimbal component permitting rotation of the payload about a roll axis may enable a compact and low weight gimbal of great configurability. The compactness and low weight may be advantageous for coupling with UAVs for aerial photography, particularly for saving energy and permitting longer travel times.

Figure 9:
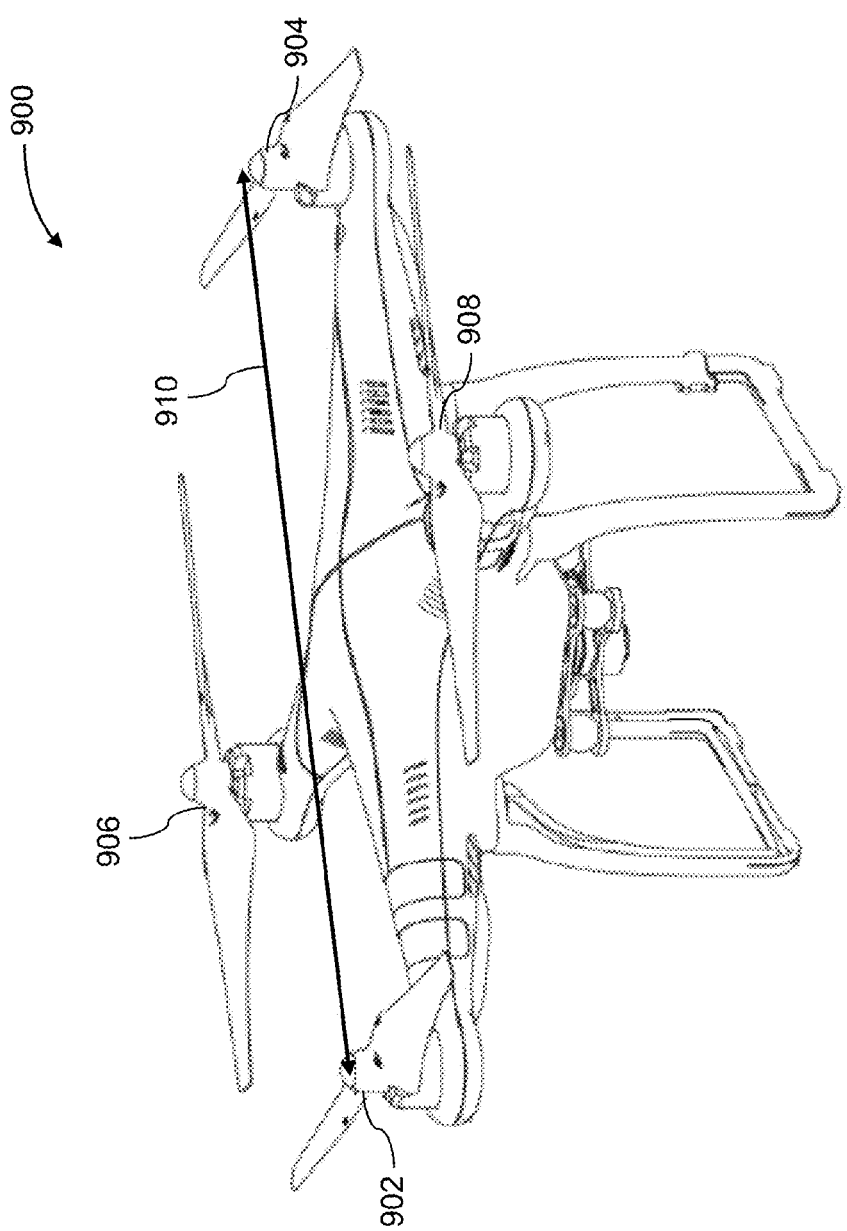
FIG. 9 illustrates an unmanned aerial vehicle, in accordance with embodiments.

FIG. 9 illustrates an unmanned aerial vehicle (UAV) 900, in accordance with embodiments of the present invention. The UAV 900 can include a propulsion system having four rotors 902, 904, 906, and 908. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload, as previously described herein. The payload may comprise an imaging device (e.g., camera).

While many embodiments are described herein as having one imaging device coupled to a UAV, it is to be understood that any number of imaging devices may be coupled to a UAV, such as one, two, three, four, five or more imaging devices. An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia).

In some embodiments, the imaging device can be a camera. A camera can be a movie or video camera that captures dynamic image data (e.g., video). A camera can be a still camera that captures static images (e.g., photographs). A camera can be a binocular camera. A binocular camera as used herein may refer to a stereo, or a stereovision camera. A stereo camera may comprise two cameras. A camera may be a monocular camera. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene.

Images obtained by the imaging devices described herein can be used for a variety of applications related to UAV operation. In some embodiments, the images are used to facilitate UAV navigation within an environment (e.g., autonomously, semi-autonomously, or manually). In some embodiments, the images are used for obstacle detection and avoidance. In some embodiments, the images can be processed to assess or determine state information for the UAV (e.g., position, orientation, velocity, and/or acceleration information). The state information can be assessed or determined using (e.g., processing with one or more processors) one or more images obtained by one or more imaging devices.

The imaging devices may each have a field of view. The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 150°, 120°, 90°, 60°, 30°, 20°, or 10°. The field of view may be described by the relative direction of the imaging device to the movable object. For example, the field of view may be oriented vertically, horizontally, upward, downward, side-ways, and the like relative to the movable object (e.g., a UAV). The imaging devices may each have an optical axis. The optical axis of an imaging device, which may also be referred to as the "principal axis," can be a line along which there is some degree of rotational symmetry in the imaging device. In some embodiments, the optical axis of the imaging device passes through the center of the optical components (e.g., lens, photo sensor) of the imaging device.

The load may include a carrier as previously described herein. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
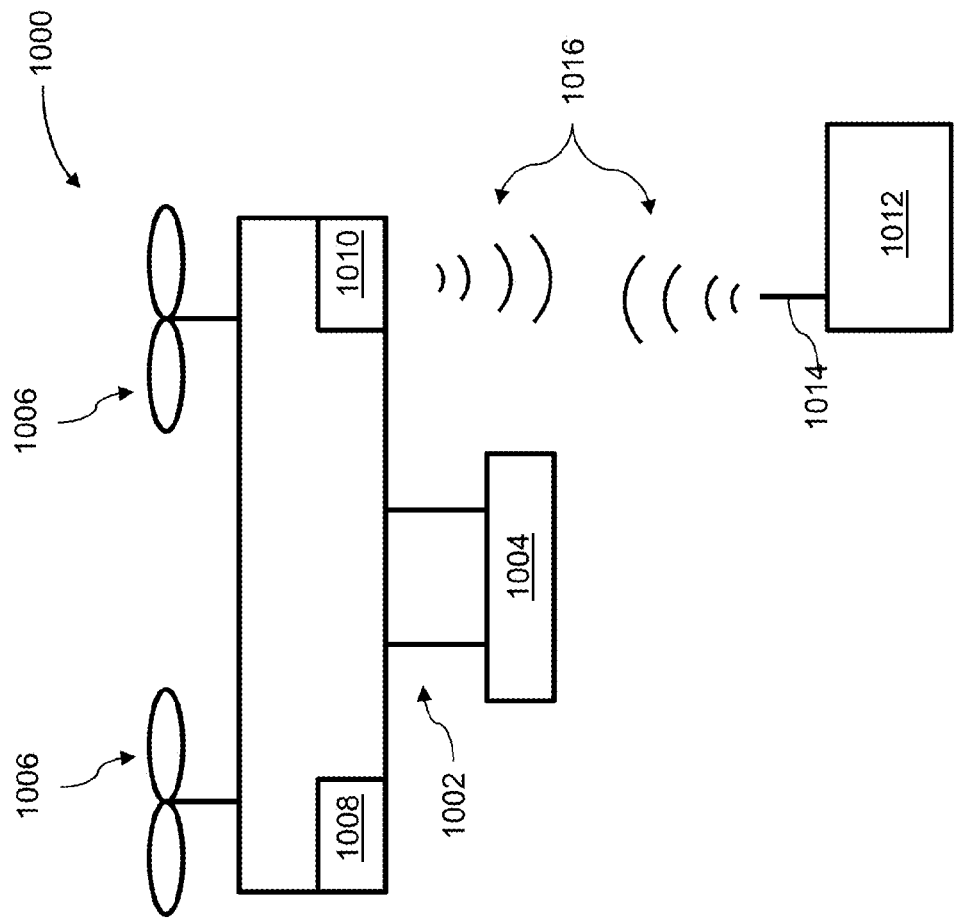
FIG. 10 illustrates a movable object, in accordance with embodiments.

FIG. 10 illustrates a movable object 1000 including a carrier 1002 and a payload 1004, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some instances, the payload 1004 may be provided on the movable object 1000 without requiring the carrier 1002. The movable object 1000 may include propulsion mechanisms 1006, a sensing system 1008, and a communication system 1010. The propulsion mechanisms 1006 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation.

For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
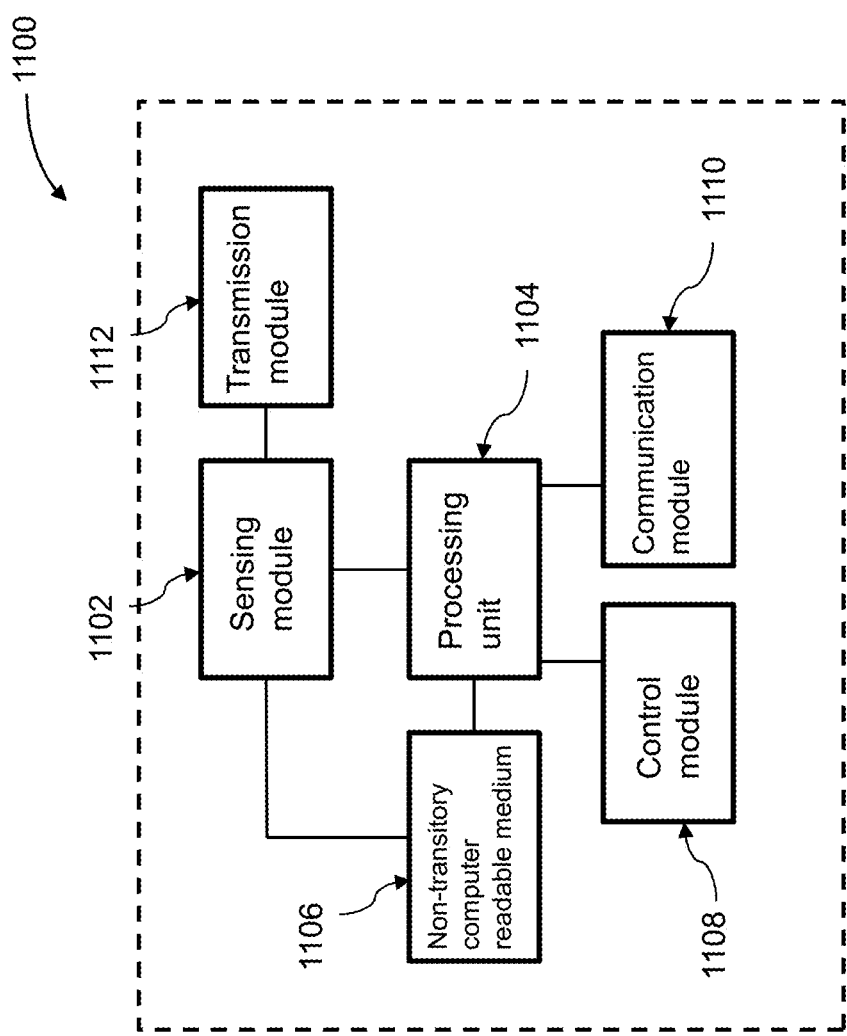
FIG. 11 is a schematic illustration by way of block diagram of a system for controlling a movable object, in accordance with embodiments.

FIG. 11 is a schematic illustration by way of block diagram of a system 1100 for controlling an movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication, as described in further detail below. The communication module 1110 can transmit and/or receive one or more of sensing data from the sensing module 1102, processing results produced by the processing unit 1104, predetermined control data, user commands from a terminal or remote controller, and the like. In some embodiments, the communication module 1110 can be configured to implement adaptive communication mode switching, as described elsewhere herein.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A carrier for stabilizing a payload, the carrier comprising:
    a first carrier component configured to permit rotation of the payload about a pitch axis;
    a second carrier component that is (1) supported by the first carrier component and (2) configured to permit rotation of the payload about a yaw axis; and
    a third carrier component that is (1) supported by the second carrier component, (2) configured to permit rotation of the payload about a roll axis and (3) connects to the payload.

2. The carrier of claim 1 wherein:
    the payload comprises a camera; and
    the camera is in communication with one or more sensors configured to sense an orientation of the camera.

3. The carrier of claim 2 wherein the one or more sensors transmit the orientation of the camera to an imaging processing device that receives an image from the camera and selects an orientation of the image based on the orientation of the camera transmitted from the one or more sensors.

4. The carrier of claim 1 wherein the second carrier component comprises a c-shaped yoke comprising one or more terminal ends, and wherein the c-shaped yoke connects to a vehicle by one or more shafts corresponding to the one or more terminal ends of the c-shaped yoke.

5. The carrier of claim 1 wherein the first carrier component comprises a mating feature configured to connect to a complimentary mating feature provided on the second carrier component to form a connection between the first carrier component and the second carrier component.

6. The carrier of claim 1, wherein the carrier has a width, length, or height equal to or less than 60 mm, or the carrier has a volume less than 150 cm$^3$.

7. The carrier of claim 1, wherein the carrier comprises one or more motors configured to actuate in response to a movement, wherein the movement is sensed using an inertial measurement unit (IMU) that is mounted in the payload or mounted on the third carrier component.

8. The carrier of claim 7 wherein the movement is further sensed using one or more position sensors, wherein each of the position sensors is configured to sense a rotation angle of a corresponding motor.

9. The carrier of claim 1 wherein the third carrier component is configured to disconnect from the payload using a quick release mechanism.

10. The carrier of claim 1, wherein the payload is configured to mechanically lock into the third carrier component via rotation, using a snap on mechanism, a slide on mechanism, or a clamp.

11. A system for stabilizing a payload, the system comprising:
    an unmanned aerial vehicle (UAV); and
    the carrier of claim 1 operably coupled to the UAV.

12. A carrier for stabilizing a payload, the carrier comprising:
    a first carrier component configured to permit rotation of the payload about a first rotational axis;
    a second carrier component that is (1) supported by the first carrier component, and (2) configured to permit rotation of the payload about a second rotational axis different from the first rotational axis; and
    a third carrier component that is (1) supported by the second carrier component, and (2) configured to permit more than or equal to a 90 degree rotation of the payload about a roll axis when the payload is supported by the third carrier component.

13. The carrier of claim 12 wherein the third carrier component that is configured to permit more than or equal to a 180 degree rotation of the payload about a roll axis when the payload is supported by the third carrier component.

14. The carrier of claim 12 wherein the first rotational axis is a pitch axis, and the second rotational axis is a yaw axis.

15. The carrier of claim 12 wherein:
the payload comprises a camera; and
the camera is in communication with one or more sensors configured to sense an orientation of the camera.

16. The carrier of claim 15 wherein the one or more sensors transmit the orientation of the camera to an imaging processing device that receives an image from the camera and selects an orientation of the image based on the orientation of the camera transmitted from the one or more sensors.

17. The carrier of claim 12 wherein the first carrier component comprises a mating feature configured to connect to a complimentary mating feature provided on the second carrier component to form a connection between the first carrier component and the second carrier component.

18. The carrier of claim 12 wherein the payload is below the second carrier component when the payload is fitted with the third carrier component.

19. The carrier of claim 12 wherein the carrier has a width, length, or height equal to or less than 60 mm, or the carrier has a volume less than 150 $cm^3$.

20. A system for stabilizing a payload, the system comprising:
an unmanned aerial vehicle (UAV); and
a carrier operably coupled to the UAV, and comprising:
a first carrier component configured to permit rotation of the payload about a first rotational axis;
a second carrier component that is (1) supported by the first carrier component, and (2) configured to permit rotation of the payload about a second rotational axis different from the first rotational axis; and
a third carrier component that is (1) supported by the second carrier component, and (2) configured to permit more than or equal to a 90 degree rotation of the payload about a roll axis when the payload is supported by the third carrier component.

* * * * *